US008697598B2

(12) United States Patent
Long et al.

(10) Patent No.: US 8,697,598 B2
(45) Date of Patent: Apr. 15, 2014

(54) HYDROGENATION CATALYST AND USE THEREOF

(75) Inventors: Xiangyun Long, Beijing (CN); Xuefen Liu, Beijing (CN); Hong Nie, Beijing (CN); Kui Wang, Beijing (CN); Jing Xin, Beijing (CN); Qinghe Liu, Beijing (CN); Xiaodong Gao, Beijing (CN); Zhihai Hu, Beijing (CN); Yahua Shi, Beijing (CN); Dadong Li, Beijing (CN)

(73) Assignees: China Petroleum & Chemical Corporation, Beijing (CN); Research Institute of Petroleum Processing, SINOPEC, Beijing (CN)

( * ) Notice: Subject to any disclaimer, the term of this patent is extended or adjusted under 35 U.S.C. 154(b) by 957 days.

(21) Appl. No.: 11/918,851

(22) PCT Filed: Apr. 20, 2006

(86) PCT No.: PCT/CN2006/000743
§ 371 (c)(1),
(2), (4) Date: Jan. 21, 2009

(87) PCT Pub. No.: WO2006/111093
PCT Pub. Date: Oct. 26, 2006

(65) Prior Publication Data
US 2009/0139898 A1 Jun. 4, 2009

(30) Foreign Application Priority Data

| Apr. 21, 2005 | (CN) | 2005 1 0064750 |
| Apr. 21, 2005 | (CN) | 2005 1 0064752 |
| Apr. 21, 2005 | (CN) | 2005 1 0064753 |
| Apr. 21, 2005 | (CN) | 2005 1 0064754 |
| May 31, 2005 | (CN) | 2005 1 0073097 |
| May 31, 2005 | (CN) | 2005 1 0073098 |
| May 31, 2005 | (CN) | 2005 1 0073099 |
| May 31, 2005 | (CN) | 2005 1 0073100 |

(51) Int. Cl.
B01J 21/04 (2006.01)
B01J 21/12 (2006.01)
B01J 29/46 (2006.01)
B01J 23/883 (2006.01)
B01J 23/888 (2006.01)
C10G 45/08 (2006.01)
C10G 45/38 (2006.01)

(52) U.S. Cl.
USPC ............... 502/315; 502/66; 502/71; 502/210; 502/211; 502/213; 208/143; 208/216 R; 208/217

(58) Field of Classification Search
USPC ............ 502/77, 113, 167, 172, 206, 207, 66, 502/71, 210, 211, 213, 254, 255, 259, 315; 208/111.3, 111.35, 143, 216 R, 217
See application file for complete search history.

(56) References Cited

U.S. PATENT DOCUMENTS

| 4,596,785 | A | 6/1986 | Toulhoat et al. |
| 5,472,595 | A | 12/1995 | Sudhakar et al. |
| 6,251,263 | B1 | 6/2001 | Hatanaka et al. |
| 6,524,470 | B1 * | 2/2003 | Kasztelan et al. ........ 208/111.05 |
| 6,555,090 | B1 | 4/2003 | Chica Lara et al. |
| 6,576,584 | B1 | 6/2003 | Iijima et al. |
| 2004/0055936 | A1 * | 3/2004 | Diehl et al. ............... 208/216 R |
| 2005/0002856 | A1 | 1/2005 | Zaluska et al. |

FOREIGN PATENT DOCUMENTS

| CA | 2579616 | | 4/2006 |
| CN | 86107828 | | 5/1988 |
| CN | 1074929 | | 8/1993 |
| CN | 1074929 | A | 8/1993 |
| CN | 1074929 | A | 8/1993 |
| CN | 1074930 | | 8/1993 |
| CN | 1074930 | A | 8/1993 |
| CN | 1174755 | A | 3/1998 |
| CN | 1184142 | A | 6/1998 |
| CN | 1249328 | A | 4/2000 |
| CN | 1289828 | | 4/2001 |
| CN | 1289830 | A | 4/2001 |
| CN | 1335363 | A | 2/2002 |
| CN | 1356380 | A | 7/2002 |
| CN | 1382775 | A | 12/2002 |
| CN | 1393528 | | 1/2003 |
| CN | 1470608 | A | 1/2004 |
| CN | 1506445 | A | 6/2004 |
| CN | 1552815 | A1 | 12/2004 |
| CN | 1552817 | A | 12/2004 |

(Continued)

OTHER PUBLICATIONS

Machile Translation of CN 1289828 A (2001), obtained from Google patent database.*
Machine Translation of CN 1074929, obtained from the SIPO patent database, (1993).*
International Search Report, Aug. 10, 2006, from International Patent Application No. PCT/CN2006/000743, filed Apr. 20, 2006.
Supplementary European Search Report from EP 06722384, mailed on Sep. 3, 2010.

(Continued)

Primary Examiner — Renee E Robinson
(74) Attorney, Agent, or Firm — Novick, Kim & Lee, PLLC; Allen Xue

(57) ABSTRACT

The present invention provides a hydrogenation catalyst, containing a carrier, metal components of nickel, molybdenum and tungsten supported thereon, and an adjuvant component selected from the group consisting of fluorine and phosphor and combination thereof. In another embodiment, the present invention provides a hydrogenation catalyst, containing a carrier and metal components of nickel, molybdenum and tungsten supported thereon, wherein said carrier contains a molecular sieve. The present invention provides further use of said catalyst in the process for hydrogenating hydrocarbon oil. In comparison with a hydrogenation catalyst according to the prior art, the catalyst according to the present invention has a much higher activity.

35 Claims, No Drawings

(56) References Cited

FOREIGN PATENT DOCUMENTS

(56) References Cited

FOREIGN PATENT DOCUMENTS

| | | | |
|---|---|---|---|
| CN | 1566281 A | 1/2005 | |
| EP | 0 143 010 | 5/1985 | |
| JP | 9 000929 | 1/1997 | |
| JP | 2003-284958 A | 10/2007 | |
| RU | 2151167 C1 | 6/2000 | |
| RU | 2216404 C1 | 11/2003 | |
| WO | WO 00/42126 | * 7/2000 | ............. C01G 45/04 |

OTHER PUBLICATIONS

Ji-Hong et al., "EXAFS Studies of Ni-W-y-Al2O3 Hydrotreating Catalyst Based on US-SSY Zeolite", J. of Vacuum Science and Technology, 1998, 18(1):2.

Dong-yan et al., "Study on WMoNi/Al2O3 Catalysts for Lube Base Oil Hydrodenitrogenation", Chemical Reaction Engineering and Technology, 2002, 18(2):115-118.

European Search Report for European Patent Application No. 12158777 mailed on Apr. 27, 2012.

P. L. Walker, et al. "The Preparation of 4A and 5A Carbon Molecular Sieves," available at http://www.ems.psu.edu/~radovic/PLW/1966_7_Walker_IndCarbonGraphite.pdf. 1966.

S. Eijsbouts, et al. "Unsupported transition metal sulfide catalysts: From fundamentals to industrial application," Applied Catalysis A: General 322 (2007), pp. 58-66. Available online Jan. 18, 2007.

C. Thomazeau, et al. "Predictive approach for the design of improved HDT catalysts: y-Alumina supported (Ni, Co) promoted Mo1-xWxS2 active phases," Applied Catalysis A: General 322 (2007), pp. 92-97. Available online Jan. 14, 2007.

John Vakros, et al. "On the synergy between tungsten and molybdenum in the W-incorporated CoMo/y-Al2O3 hydrodesulfurization catalysts," Applied Catalysis A: General 217 (2001), pp. 287-293.

Deuk Ki Lee, et al. "Modification of the alumina-supported Mo-based hydrodesulfurization catalysts by tungsten," Catalysis Letters 53 (1998), pp. 193-198.

Teh C. Ho. "Deep HDS of diesel fuel: chemistry and catalysis," Catalysis Today 98 (2004), pp. 3-18. Available online Sep. 11, 2004.

Antony Stanislaus, et al. "Recent advances in the science and technology of ultra low sulfur diesel (ULSD) production," Catalysis Today 153 (2010), pp. 1-68.

Henrik Topsoe. "The role of Co—Mo—S type structures in hydrotreating catalysts," Applied Catalysis A: General 322 (2007), pp. 3-8. Available online Jan. 4, 2007.

J. V. Lauritsen, et al. "Atomic-scale insight into structure and morphology changes of MoS2 nanoclusters in hydrotreating catalysts," Journal of Catalysis 221 (2004), pp. 510-522.

M. Absi-Halabi, et al. "Performance comparison of alumina-supported Ni—Mo, Ni—W and Ni—Mo—W catalysts in hydrotreating vacuum residue," Fuel vol. 77, No. 7 (1998), pp. 787-790.

Juan Arturo Mendoza-Nieto, et al. "Development of new trimetallic NiMoW catalysts supported on SBA-15 for deep hydrodesulfurization," Fuel 110 (2013), pp. 268-277.

Chunshan Song, et al. "Desulfurization," available online at http://organica1.org/ops_85/desulfurization.pdf, (2006).

Chunshan Song. "An overview of new approaches to deep desulfurization for ultra-clean gasoline, diesel fuel and jet fuel," Catalysis Today 86 (2003), pp. 211-263.

Chunshan Song, et al. "New design approaches to ultra-clean diesel fuels by deep desulfurization and deep dearomatization," Applied Catalysis B: Environmental 41 (2003), pp. 207-238.

Cecile Thomazeau, et al. "Two Cation Disulfide Layers in the WxMo(1-x)S2 Lamellar Solid Solution," Journal of Solid State Chemistry 160 (2001), pp. 147-155. Published online Jun. 11, 2001.

* cited by examiner

HYDROGENATION CATALYST AND USE THEREOF

TECHNICAL FIELD

The present invention relates to a hydrogenation catalyst and use of the same in the process for hydrogenating hydrocarbon oil.

BACKGROUND OF THE ART

Under hydrogenation conditions, when a hydrocarbon feedstock contacts with a catalyst, reactions that may occur include, such as, hydrogenation, hydrodesulfurization, hydrodenitrogenation, hydrodemetallization, hydrodearomatization, hydroisomerization, hydrodewaxing, hydrocracking and mild hydrocracking and so on. In this case, the catalyst is generally composed of carrier-supported VIB group and VIII group metal components. The hydrogenation-active metal components are usually selected from Co or Ni—Mo or Co or Ni—W, and the carrier is usually selected from alumina, silica-alumina and their modifiers. These catalysts can be prepared by steps of impregnating the carrier with an aqueous solution containing said metal compounds, then drying and calcining the thus obtained, and the like; or by co-precipitating the carrier together with VIII Group metal components and VIB Group metal components. Generally speaking, for a reaction process wherein desulfurization is the main reaction, the hydrogenation-active metal component of the catalyst is preferably a Co(Ni)—Mo combination; and for a reaction process wherein hydrogenation is the main reaction, such as an aromatic-saturation reaction, the metal component is preferably a Ni—W combination.

Under certain conditions, the Mo-modified NiW/Al$_2$O$_3$ (The hydrodesulfurizing performance of the Mo-modified NiW/Al$_2$O$_3$ catalyst for thiophene, *Proceedings of China 10th Catalysis Meeting*, 2000, p 491) or the W-modified NiMo/Al$_2$O$_3$ (Modification of the alumina-supported Mo-based hydrodesulfurization catalysts by tungsten, *Catalysis Letters* 53 (1998), 193~198) are all favorable for increasing the activity of alumina-carrier-supported catalysts.

CN1083476C discloses a hydrorefining catalyst for distillates and a method for producing the same. Said catalyst, comprising VIII Group and VIB Group metals as the active component, phosphor as the adjuvant, and alumina or siliceous alumina as the carrier, is characterized in that said catalyst comprises W, Mo, Ni as the active components, P as the co-catalytic component, and based on the weight of the catalyst, it contains 13~25 wt % of WO$_3$, 6~14 wt % of MoO$_3$, 2~7 wt % of NiO and 1~9 wt % of P$_2$O$_5$, with a pore volume of 0.22~0.37 ml/g, and a specific surface area of 110~170 m$^2$/g. The method for producing the catalyst comprises: weighing alumina or siliceous alumina as the carrier; W, Mo and Ni as the active components, and P as the adjuvant component, formulating a co-immersing solution with these components, then heating the solution at 70~120° C., repeatedly impregnating the carrier in said co-immersing solution, drying the impregnated carrier at 80~150° C. for 8 hrs, then calcining it at 450~550° C. for 2~5 hrs to obtain the catalyst.

CN1098915C discloses a hydrorefining catalyst and a preparation method thereof. The catalyst comprises VIII Group and VIB Group metals as the active components, and boron as the adjuvant component, characterized in that, by weight percentage, the catalyst comprises 3~10% of SiO$_2$, 5~10% of MoO$_3$, 10~25% of WO$_3$, 2~5% of NiO, and 2~5% of B$_2$O$_5$. Said catalyst is prepared by impregnating a molded carrier once with a mixed solution containing the active components and the adjuvant component, then drying and calcining the thus obtained.

In addition, with the increasing demand for diesel oil across the world in recent years, it is required for the catalytic cracking process to produce diesel oil in a higher yield. The catalytic cracked diesel oil is characterized in high sulfur, nitrogen and aromatics contents, low cetane number, poor store stability and large volume of toxic gases generated from the combustion. Hydrotreation of diesel oil in the presence of a hydrotreating catalyst can remove sulfur and nitrogen, and decrease aromatic content, resulting in diesel oil with an improved quality.

CN1054150C discloses a conversion catalyst for hydrogenating diesel oil. The catalyst comprises a carrier consisting of alumina, an amorphous silica-alumina and a molecular sieve, and hydrogenation active metals supported on the carrier. The catalyst contains 10~30 wt % of WO$_3$, 2~15 wt % of NiO, 5~45 wt % of the molecular sieve, 30~70 wt % of alumina, and 5~25% of the amorphous silica-alumina. Said molecular sieve is a Y-molecular sieve having an infrared total acidity of 0.5~1 mmole/g and a lattice constant of 2.436~2.444 nm. Said alumina is a micropore alumina with a pore volume of 0.8~1.1 ml/g and a surface area of 230~400 m$^2$/g.

CN1184843A discloses a conversion catalyst for hydrogenating diesel oil, comprising: 40~80 wt % of alumina, 0~20 wt % of an amorphous silica-alumina, and 5~30 wt % of a molecular sieve which is a Y-molecular sieve having a pore volume of 0.40~0.52 ml/g, a specific surface area of 750~900 m$^2$/g, a lattice constant of 2.420~2.500 and a silica-alumina ratio of 7~15, and 10~30 wt % of a VIB group metal and 2~15 wt % of a VIII group-metal oxide.

U.S. Pat. No. 5,030,780 discloses a saturation process for aromatic compounds in the presence of a catalyst containing hydrogenation metals supported on a carrier. Said carrier contains a zeolite and a porous heat-resistant inorganic oxide, especially a heat-resistant inorganic oxide having silica-alumina dispersed in an alumina matrix. Said zeolite includes various crystallo-silica-alumina zeolites, naturally occurred or synthesized, such as faujasite, mordenite, erionite zeolite, Y-zeolite, X-zeolite, L-zeolite, Ω-zeolite, ZSM-4 zeolite, Beta-zeolite and the like.

CN1400284A discloses a hydrotreating catalyst for diesel oil, which contains a carrier and molybdenum and/or tungsten and nickel and/or cobalt supported thereon, characterized in that said carrier is composed of alumina and a zeolite, with a weight-ratio of alumina to zeolite in the range of from 90:10 to 50:50. Said alumina is composed of a micropore alumina and a macropore alumina in a weight-ratio in the range of from 75:25 to 50:50, wherein the micropore alumina is one wherein the volume of the pores of less than 80 Angstrom in diameter accounts for 95% or more of the total pore volume, and the macropore alumina is one wherein the volume of the pore having a diameter of 60~600 Angstrom accounts for 70% or more of the total pore volume.

In comparison with a conventional hydrogenation catalyst comprising two metal components, the hydrogenation catalyst comprising three metal components according to the prior art shows a mildly rather than sufficiently improved activity. The catalyst does not sufficiently meet the increasing needs for hydrogenating hydrocarbon oil.

DISCLOSURE OF THE INVENTION

An object of the present invention is to provide, on the basis of the prior art, a novel hydrogenation catalyst with a high activity, comprising three hydrogenation-active metal components, and a method for producing the same.

In the context of the present invention, the concept "hydrogenation catalyst" is used in its broadest sense, comprising, but not limited to, a hydrotreating catalyst, a hydrorefining catalyst and a hydrocracking catalyst, preferably a hydrotreating catalyst.

In the first embodiment, the present invention provides a hydrogenation catalyst containing a carrier and metal components of nickel, molybdenum and tungsten supported thereon, wherein calculated on an oxide basis, and on the basis of the catalyst, the nickel is 1~10 wt %, and the sum of molybdenum and tungsten is from more than 10, to 50 wt %, wherein the molar ratio of tungsten oxide to molybdenum oxide is from more than 2.6, to 30. The catalyst contains further an adjuvant component selected from fluorine, phosphor and combination thereof, wherein calculated on an element basis, and on the basis of the catalyst, the content of said adjuvant component is 0.2~14 wt %.

In the second embodiment, the present invention provides a hydrogenation catalyst containing a carrier and metal components of nickel, molybdenum and tungsten supported thereon, wherein said carrier contains a molecular sieve, and the hydrogenation catalyst has a calcined composition of nickel oxide of 1~10 wt %, the sum of molybdenum oxide and tungsten oxide of from more than 10, to 50 wt %, the balance being the carrier, and the molar ratio of tungsten oxide to molybdenum oxide of from more than 2.6, to 30, and wherein said calcined composition refers to the composition of the concerned catalyst after calcined at 550° C. under the atmosphere for 4 hrs.

Another object of the present invention is to provide, on the basis of the prior art, a novel and more effective process for hydrogenating hydrocarbon oil.

The process according to the present invention comprises contacting hydrocarbon oil feedstock with the catalyst according to the present invention under hydrogenation conditions in the presence of hydrogen. In comparison with the prior art process, the efficiency of hydrogenation process according to the present invention is obviously high.

That is to say, the present invention relates to the following inventive aspects:

1. A hydrogenation catalyst, containing a carrier, metal components of nickel, molybdenum and tungsten supported thereon, wherein calculated on an oxide basis, and on the basis of the catalyst, the content of nickel is 1~10 wt %, the sum of molybdenum and tungsten is from more than 10, to 50 wt %, wherein the molar ratio of tungsten oxide to molybdenum oxide is from more than 2.6, to 30; and further an adjuvant component selected from fluorine, phosphor and combination thereof, wherein calculated on an element basis, and on the basis of the catalyst, the content of said adjuvant component is 0.2~14 wt %.

2. The hydrogenation catalyst according to Aspect 1, characterized in that, calculated on an oxide basis, and on the basis of the catalyst, the nickel is 1~7 wt %, the sum of molybdenum and tungsten is from more than 15 to 45 wt %, the molar ratio of tungsten oxide to molybdenum oxide is from more than 3.1 to 24, and calculated on an element basis, and on the basis of the catalyst, the content of said adjuvant component is 0.5~9 wt %.

3. The hydrogenation catalyst according to Aspect 2, characterized in that the content of said adjuvant component is 0.5~7 wt %, calculated on an element basis, and on the basis of the catalyst.

4. The hydrogenation catalyst according to Aspect 1, characterized in that said adjuvant component is selected from phosphor, with a content of 0.4~4 wt %, calculated on an element basis, and on the basis of the catalyst.

5. The hydrogenation catalyst according to Aspect 1, characterized in that said adjuvant component is selected from fluorine, with a content of 1~10 wt %, calculated on an element basis, and on the basis of the catalyst.

6. The hydrogenation catalyst according to Aspect 1, characterized in that said adjuvant component is selected from a combination of phosphor and fluorine, with a phosphor content of 0.2~3.5 wt % and a fluorine content of 1~10 wt %, calculated on an element basis, and on the basis of the catalyst.

7. The hydrogenation catalyst according to Aspect 1, characterized in that said carrier is selected from the group consisting of alumina, silica-alumina and their combination, or a mixture with a molecular sieve.

8. The hydrogenation catalyst according to Aspect 7, characterized in that said alumina is one or more selected from the group consisting of γ-alumina, η-alumina, θ-alumina, δ-alumina and χ-alumina; or one or more selected from the group consisting of γ-alumina, η-alumina, θ-alumina, δ-alumina and χ-alumina, containing one or more additional component(s) selected from the group consisting of titanium, magnesium, boron, zirconium, thorium, niobium and the rare earth metal.

9. The hydrogenation catalyst according to Aspect 8, characterized in that said alumina is γ-alumina or γ-alumina containing one or more additional component(s) selected from the group consisting of titanium, magnesium, boron, zirconium, thorium, niobium and the rare earth metal.

10. The hydrogenation catalyst according to Aspect 7, characterized in that the silica content is 2~45 wt % and the alumina content is 55~98 wt %, based on the silica-alumina.

11. The hydrogenation catalyst according to Aspect 10, characterized in that the silica content is 5~40 wt % and the alumina content is 60~95 wt %, based on the silica-alumina.

12. The hydrogenation catalyst according to Aspect 7, characterized in that said molecular sieve is one or more selected from the group consisting of a zeolite molecular sieve and a non-zeolite type molecular sieve, wherein the content of said molecular sieve in the carrier is 0.5~85 wt %, based on the carrier.

13. The hydrogenation catalyst according to Aspect 12, characterized in that said molecular sieve is one or more selected from the group consisting of a Y-zeolite molecular sieve, a beta-zeolite molecular sieve, a mordenite molecular sieve and a ZSM-5 molecular sieve, wherein the content of said molecular sieve in the carrier is 5-50 wt %, based on the carrier.

14. The hydrogenation catalyst according to Aspect 13, characterized in that said molecular sieve is one or more selected from the group consisting of a Y-zeolite molecular sieve, a beta-zeolite molecular sieve and a ZSM-5 molecular sieve.

15. A hydrogenation catalyst, containing a carrier and metal components of nickel, molybdenum and tungsten supported thereon, wherein said carrier contains a molecular sieve as a carrier component, and said hydrogenation catalyst has a calcined composition of nickel oxide of 1~10 wt %, the sum of molybdenum oxide and tungsten oxide of from more than 10, to 50 wt %, the balance being the carrier, and the molar ratio of tungsten oxide to molybdenum oxide of from more than 2.6, to 30, wherein said calcined composition refers to the composition of the concerned catalyst after calcined at 550° C. under the atmosphere for 4 hrs.

16. The hydrogenation catalyst according to Aspect 15, characterized in that the hydrogenation catalyst has a calcined composition of nickel oxide of 1~7 wt %, the sum of molybdenum oxide and tungsten oxide contents of from more than 15 to 45 wt %, the balance being the carrier, and said molar ratio of tungsten oxide to molybdenum oxide is from more than 3.1 to 24.

17. The hydrogenation catalyst according to Aspect 15, characterized in that said carrier is a mixture of alumina and/or silica-alumina with a molecular sieve.

18. The hydrogenation catalyst according to Aspect 17, characterized in that the silica content is 2~45 wt % and the alumina content is 55~98 wt %, based on the silica-alumina.

19. The hydrogenation catalyst according to Aspect 18, characterized in that the silica content is 5~40 wt % and the alumina content is 60~95 wt %, based on the silica-alumina.

20. The hydrogenation catalyst according to Aspect 17, characterized in that said alumina is one or more selected from the group consisting of γ-alumina, η-alumina, θ-alumina, δ-alumina and χ-alumina; or one or more selected from the group consisting of γ-alumina, η-alumina, θ-alumina, δ-alumina and χ-alumina, containing one or more additional component(s) selected from the group consisting of titanium, magnesium, boron, zirconium, thorium, niobium and the rare earth metal.

21. The hydrogenation catalyst according to Aspect 20, characterized in that said alumina is γ-alumina or γ-alumina containing one or more additional component(s) selected from the group consisting of titanium, magnesium, boron, zirconium, thorium, niobium and the rare earth metal.

22. The hydrogenation catalyst according to Aspect 17, characterized in that said molecular sieve is one or more selected from a zeolite type molecular sieve and a non-zeolite type molecular sieve.

23. The hydrogenation catalyst according to Aspect 22, characterized in that said molecular sieve is one or more selected from the group consisting of a Y-zeolite molecular sieve, a beta zeolite molecular sieve, a mordenite molecular sieve, a ZSM-5 molecular sieve and a SAPO-11 molecular sieve.

24. The hydrogenation catalyst according to Aspect 23, characterized in that said molecular sieve is one or more selected from the group consisting of a Y-zeolite molecular sieve, a beta zeolite molecular sieve, a ZSM-5 molecular sieve and a SAPO-11 molecular sieve.

25. The hydrogenation catalyst according to Aspect 17, characterized in that the content of said molecular sieve is 0.5~85 wt %, based on the carrier.

26. The hydrogenation catalyst according to Aspect 25, characterized in that the content of said molecular sieve is 1~55 wt %, as based on the carrier.

27. The hydrogenation catalyst according to any of aforementioned Aspects, characterized in that said catalyst contains further one or more organic compound(s) selected from the group consisting of oxygen-containing and nitrogen-containing organic compounds, wherein the ratio by molar of said organic compound to the sum (on an oxide basis) of nickel, molybdenum and tungsten is 0.03~2.

28. The hydrogenation catalyst according to Aspect 27, characterized in that said oxygen-containing organic compound is one or more selected from the group consisting of organic alcohols and organic acids, and said nitrogen-containing organic compound is one or more selected from the group consisting of organic amines, wherein the ratio by molar of said organic compound to the sum (on an oxide basis) of nickel, molybdenum and tungsten is 0.08~1.5.

29. The hydrogenation catalyst according to any of aforementioned Aspects, characterized in that said hydrogenation catalyst is a hydrotreating catalyst, a hydrorefining catalyst or a hydrocracking catalyst.

30. The hydrogenation catalyst according to Aspect 29, characterized in that said hydrogenation catalyst is a hydrotreating catalyst.

31. A process for hydrogenating hydrocarbon oil, comprising contacting a hydrocarbon oil feedstock with the hydrogenation catalyst according to any of Aspects 1 to 30 in the presence of hydrogen under hydrogenation conditions.

32. The process for hydrogenating hydrocarbon oil according to Aspect 31, characterized in that said hydrogenation conditions comprise: a reaction temperature of 200~420° C., a hydrogen partial pressure of 2~18 MPa, a liquid hourly space velocity of 0.3~10 hrs$^{-1}$ and a H/O volume ratio of 50~5000.

33. The process for hydrogenating hydrocarbon oil according to Aspect 32, characterized in that said hydrogenation conditions comprise: a reaction temperature of 220~400° C., a hydrogen partial pressure of 2~15 MPa, a liquid hourly space velocity of 0.3~5 hrs$^{-1}$ and a H/O volume ratio of 50~4000.

34. The process for hydrogenating hydrocarbon oil according to any of Aspects 31~33, characterized in that said hydrocarbon oil is one or more selected from the group consisting of crude oil, distillate oil, solvent-refined oil, paraffin jelly, sweat oil, Fischer-Tropsch oil, coal liquefaction oil, light deasphalted oil and heavy deasphalted oil.

35. The process for hydrogenating hydrocarbon oil according to Aspect 31, characterized in that said process for hydrogenating hydrocarbon oil is a process for hydrotreating hydrocarbon oil.

PREFERRED EMBODIMENTS TO CARRY OUT THE INVENTION

In the first embodiment, the catalyst according to the present invention is preferably that, calculated on an oxide basis, and on the basis of the catalyst, the nickel content is 1~7 wt %, and the sum of molybdenum and tungsten is from more than 15 to 45 wt %, wherein the molar ratio of tungsten oxide to molybdenum oxide is from more than 3.1 to 24, and, calculated on an element basis, and on the basis of the catalyst, the content of said adjuvant component is 0.5~9 wt %, more preferably 0.5~7 wt %.

When the hydrogenation catalyst according to the present invention is introduced with one adjuvant component selected from phosphor and fluorine, calculated on an element basis, and on the basis of the catalyst, said phosphor content is preferably 0.4~4 wt %, more preferably 0.6~3.1 wt %, and, calculated on an element basis, and on the basis of the catalyst, said fluorine content is preferably 1~10 wt %, more preferably 1~7 wt %.

When the hydrogenation catalyst according to the present invention is introduced with a combination of phosphor and fluorine as the adjuvant component, calculated on an element basis, and on the basis of the catalyst, said phosphor content is 0.2~3.5 wt % and said fluorine content is 1~10 wt %; more preferably, said phosphor content is 0.3~2.6 wt % and said fluorine content is 1~7 wt %.

Said carrier in the present invention can be any of the carrier commonly used for preparing a catalyst, without any special limitation, for example, one or more selected from various heat-resistant inorganic oxides that are commonly used as catalyst carriers and/or matrixes in this field. There is also no any special limitation on said heat-resistant inorganic oxide, it can be selected according to common knowledge, for example, but not limited to, alumina, silica, zirconia, titanium oxide, magnesium oxide, thorium oxide, beryllium oxide, alumina-silica, alumina-titanium oxide, alumina-magnesium oxide, silica-magnesium oxide, silica-zirconia, silica-thorium oxide, silica-beryllium oxide, silica-titanium oxide, titanium oxide-zirconia, silica-alumina-zirconia, silica-alumina-thorium oxide, silica-alumina-titanium oxide or silica-alumina-magnesium oxide, preferably alumina, silica-alumina and combination thereof, or a mixture with a molecular sieve, more preferably alumina, silica-alumina and combination thereof.

As a preferred carrier, there is no any special limitation on said alumina, it can be a commercially available one, or can be prepared by any of the method available in the prior art. For example, it can be prepared by molding and calcining one (or a mixture of more) selected from alumina trihydrate, mono-alumina hydrate and amorphous aluminum hydroxide, or by molding and calcining one or (or a mixture of more) selected from alumina trihydrate, mono-alumina hydrate and amorphous aluminum hydroxide, which contains one or more additional component(s) selected from titanium, magnesium, boron, zirconium, thorium, niobium and the rare earth metal.

In preferred embodiments, said alumina is one or more selected from the group consisting of γ-alumina, η-alumina, θ-alumina, δ-alumina and χ-alumina, or one or more selected from the group consisting of γ-alumina, η-alumina, θ-alumina, δ-alumina and χ-alumina, containing one or more additional components selected from the group consisting of titanium, magnesium, boron, zirconium, thorium, niobium and the rare earth metal. Preferably is γ-alumina and γ-alumina containing one or more additional components selected from the group consisting of titanium, magnesium, boron, zirconium, thorium, niobium and the rare earth metal.

As preferred carrier, there is no any special limitation on said silica-alumina, it can be a commercially available one, or can be prepared by any of the method available in the prior art. For example, as a commercially available one, there is Siral 40 (a silica-alumina product from Germany Condea Corp.). As a preferred preparation method of said silica-alumina, for example, what can be mentioned is one comprising mixing alumina and/or a precursor of alumina with silica and/or a precursor of silica and calcining the thus obtained mixture. It is preferable to control the amount of each of the components to be used, so as to obtain a carrier containing 2~45 wt % of silica and 55~98 wt % of alumina, more preferably 5~40 wt % of silica and 60~95 wt % of alumina, on the basis of the silica-alumina. There is no any special limitation on said calcining conditions, but preferably the calcining temperature is 450~650° C. and the calcining time is 1~10 hrs, more preferably, the calcining temperature is 500~620° C. and the calcining time is 2~8 hrs.

In preferred embodiments, based on the silica-alumina carrier, the silica content in said silica-alumina carrier is 2~45 wt % and the alumina content is 55~98 wt %, more preferably, the silica content is 5~40 wt % and the alumina content is 60~95 wt %.

As previously discussed, as needed, the carrier used for preparing the catalyst according to the present invention can comprise a molecular sieve as a carrier component. There is no any special limitation on said molecular sieve, but preferably one or more selected from a zeolite molecular sieve and a non-zeolite type molecular sieve that are commonly used as a catalytic cracking active component in this field. For example, said molecular sieve can be one or more selected from the group consisting of ZRP molecular sieve, Y-zeolite molecular sieve, beta zeolite molecular sieve, mordenite molecular sieve, ZSM-5 molecular sieve, MCM-41 molecular sieve, Ω molecular sieve, ZSM-12 molecular sieve and MCM-22 zeolite molecular sieve, preferably one or more selected from Y-zeolite, beta zeolite molecular sieve, mordenite molecular sieve and ZSM-5 molecular sieve, more preferably one or more selected from Y-zeolite molecular sieve, beta zeolite molecular sieve and ZSM-5 molecular sieve. Said molecular sieve can be a commercially available one, or can be prepared by any of the method available in the prior art.

When the carrier used for the catalyst according to the present invention comprises a molecular sieve as the carrier component, the content of said molecular sieve is preferably 0.5~85 wt %, more preferably 5~50 wt %, based on the carrier.

The carrier used for preparing the catalyst according to the present invention can be molded into various forms convenient for handling, as needed, for example, a microsphere, a spheroid, a tablet or a stripe. In this connection, molding can be carried out according to the conventional method, for example, a method comprising extrusion-molding one (or a mixture of more) selected from alumina and/or its precursor, silica and/or its precursor, and a molecular sieve, and then calcining the extrudant. In this connection, said alumina precursor can be one or more selected from various alumina hydrates and alumina sols, while said silica precursor can be any of water soluble siliceous compounds and siliceous compounds that can be hydrolyzed in an aqueous media to form a silica gel or sol, for instance, one or more selected from the group consisting of water glass, silica sol and silicate and the like. For extrusion-molding the carrier, suitable amounts of extruding aids and/or peptizing agents can be added to the carrier before the extrusion-molding. The extruding aids and the peptizing agents to be used, and the amounts thereof, are well-known for one skilled in this field. For example, an extruding aid can be one or more selected from the group consisting of sesbania powder, methyl cellulose, starch, polyvinyl alcohol and polyethanol.

The catalyst according to the present invention can contain further one or more organic compounds selected from the group consisting of oxygen-containing or nitrogen-containing organic compounds. In a preferred embodiment, said oxygen-containing organic compound is one or more selected from the group consisting of organic alcohols and organic acids; while said nitrogen-containing organic compound is one or more selected from the group consisting of organic amines. For example, the oxygen-containing organic compound that can be mentioned is one or more selected from ethylene glycol, glycerol, polyethylene glycol (with a molecular weight of 200~1500), diethylene glycol, butanediol, acetic acid, maleic acid, oxalic acid, aminotriacetic acid, 1,2-cyclohexanediamine tetraacetic acid, citric acid, tartaric acid, malic acid; while the nitrogen-containing organic compound that can be mentioned is ethylenediamine, EDTA and their ammonium salts. The ratio by molar of said organic compound to the sum (on an oxide basis) of nickel, molybdenum and tungsten is 0.03~2, preferably 0.08~1.5.

There is no any special limitation on the method for producing the aforementioned catalysts, and any method can be used as long as various additional components (including the metal component, i.e. molybdenum, nickel and tungsten metal components, and the adjuvant component, i.e., that selected from fluorine, phosphor and combination thereof) can be introduced into the carrier by it. For instance, a method that can be mentioned is one comprising contacting directly said adjuvant compound (i.e., a compound used for introducing the adjuvant component) or a solution containing said adjuvant compound with one (or a mixture of more) selected from alumina and/or its precursor, silica and/or a precursor of silica, and a molecular sieve, after extrusion-molding and calcining the resultant, further introducing metal components therein; or one comprising formulating a mixed solution containing said adjuvant compound, a molybdenum compound, a nickel compound and a tungsten compound, then contacting the mixed solution with said carrier; or one comprising formulating a solution of said adjuvant compound, contacting said carrier with the solution, then calcining the resultant, and then further introducing therein metal components, and the like. The method for introducing metal components can be any conventional one, for instance, a method that can be mentioned is one comprising impregnating respectively or simultaneously the carrier with a molybdenum compound solution, a nickel compound solution and a tungsten compound solution, and the like. For introducing the adjuvant component and the metal components respectively into the carrier, a preferred method is one wherein said carrier contacts with a solution containing the adjuvant compound before calcination, then contacts further with a solution containing the metal component compounds. Said contacting step can be achieved by any method, for example, an impregnation method. The impregnation method can be any conventional one. According to the present invention, it is obvious for one skilled in this field that a catalyst having a predetermined contents of the additional components can be easily prepared by adjusting and controlling the concentration and amount of each of the solutions to be used, or the amount of the carrier to be used, wherein said solutions refer to the metal component solutions and the adjuvant component solution.

Equipment and the like used for producing the catalyst according to the present invention are also well known in this field, therefore, redundant description thereon should be omitted.

According to the present invention, when metal components and an adjuvant component are introduced for preparing the catalyst, it is preferably to select the amounts of various additional components to be used, so that a catalyst is obtained with the content of each of the additional components in the predetermined range as required by the present invention.

According to the present invention, after said impregnating step, steps like drying and calcining can be introduced as needed. Said drying and calcining conditions are all conventional in this art. For example, the drying temperature is 100~300° C., preferably 100~280° C., the drying time is 1~12 hrs, preferably 2~8 hrs: the calcining temperature is 350~550° C., preferably is 400~500° C., and the calcining time is 1~10 hrs, preferably 2~8 hrs.

In the preparation of said catalyst according to the present invention, said molybdenum compound, nickel compound and tungsten compound, said fluorine adjuvant component and phosphor adjuvant component are all commonly known in this field, without any special limitation. For example, said fluorine adjuvant component can be selected from soluble fluorine compounds, such as, one or more selected from the group consisting of ammonium fluoroborate, hydrofluoric acid, hydrofluoride, hydrofluosilicic acid, fluosilicate and ammonium fluoride, wherein preferred is ammonium fluoride, hydrofluosilicic acid and/or ammonium fluosilicate, more preferred is ammonium fluoride and/or ammonium fluosilicate. Said phosphor adjuvant component can be selected from soluble phosphor compounds, such as, one or more selected from the group consisting of phosphoric acid, phosphorous acid, phosphate, phosphite and trimethyl phosphate, wherein preferred is one or more selected from phosphoric acid, ammonium phosphate and ammonium hydrogen phosphate. Said molybdenum compound can be selected from soluble molybdenum compounds, such as, one or more selected from the group consisting of ammonium molybdate, ammonium paramolybdate and ammonium phosphomolybdate. Said nickel compound can be selected from soluble nickel compounds, such as, one or more selected from the group consisting of nickel nitrate, basic nickel carbonate, nickel chloride and nickel sulphate. Said tungsten compound can be selected from soluble tungsten compounds, such as, one or more selected from ammonium metatungstate and ethyl ammonium metatungstate.

When the catalyst according to the present invention contains further organic compounds, the method for introducing said organic compound can be any one, for instance, one comprising formulating a mixed solution containing said organic compound and other components (including the metal components and the adjuvant component and the like), impregnating the carrier with the mixed solution, and then drying; or one comprising formulating a solution of the organic compound, and then impregnating the carrier with the solution. In the last case, preferred is a method comprising introducing the solutions containing other components than the organic compound to impregnate said carrier, after drying and calcining or without calcining, impregnating further the resultant with a solution containing the organic compound, and then drying. Said drying can be carried out by any conventional method without any special limitation, for instance, the drying temperature is preferably 100~300° C., the drying time is preferably 1~12 hrs, more preferably, the drying temperature is 100~250° C. and the drying time is 2~8 hrs. Said calcining conditions are also conventional. For example, the calcining temperature is 350~550° C., preferably 400~500° C., the calcining time is 1~10 hrs, preferably 2~8 hrs.

According to the present invention, for preparing said catalyst containing the organic compound, it is preferably to select the amount of said organic compound to be introduced, so as to obtain a catalyst having a ratio by molar of said organic compound to the sum (on an oxide basis) of nickel, molybdenum and tungsten is 0.03~2.0, preferably 0.08~1.5.

In comparison with the catalyst according to the prior art, the catalyst according to the present invention achieves a higher desulfurization activity, denitrogenation activity and dearomatization activity simultaneously, especially for the hydrogenation of distillates. Furthermore, it is surprisingly found that the catalyst containing both of phosphor and fluorine as the adjuvant component shows an obviously improved activity over that containing only either of them with the same content as the sum of the both.

In the second embodiment, it is preferably that the hydrogenation catalyst according to the present invention has a calcined composition of nickel oxide of 17 wt %, the sum of molybdenum oxide and tungsten oxide of from more than 15 to 45 wt %, the balance being the carrier, and the molar ratio of tungsten oxide to molybdenum oxide of from more than 3.1 to 24, wherein said calcined composition refers to the composition of the concerned catalyst after calcined at 550° C. under the atmosphere for 4 hrs.

The second embodiment according to the present invention is similar to the first embodiment except for the below mentioned.

In the second embodiment of the present invention, it is important for said carrier to contain a molecular sieve as the carrier component. That is to say, said carrier is a composite carrier containing a molecular sieve as one of the carrier component. It can be a composite comprising a conventional carrier that is used as a carrier for a hydrocracking or hydrotreating catalyst, and a molecular sieve, preferably a mixture of alumina and/or silica-alumina with a molecular sieve.

Herein, there is no any special limitation on said molecular sieve, for example, one or more selected from a zeolite molecular sieve and a non-zeolite molecular sieve that are often used as the active component of a cracking catalyst. For example, said molecular sieve can be one or more selected from the group consisting of ZRP molecular sieve, Y-zeolite molecular sieve, beta zeolite molecular sieve, mordenite molecular sieve, ZSM-5 molecular sieve, SAPO-11 molecular sieve, MCM-41 molecular sieve, Ω molecular sieve, ZSM-12 molecular sieve and MCM-22 zeolite molecular sieve, preferably one or more selected from the group consisting of Y-zeolite molecular sieve, beta zeolite molecular sieve, mordenite molecular sieve, ZSM-5 molecular sieve and SAPO-11 molecular sieve; more preferably one or more of Y-zeolite molecular sieve, beta zeolite molecular sieve, ZSM-5 molecular sieve and SAPO-11 molecular sieve. Said molecular sieve can be commercially available, or be prepared by any conventional method.

When said carrier is a mixture of alumina and/or silica-alumina with a molecular sieve, the content of said molecular sieve is preferably 0.5~85 wt %, more preferably 1~55 wt %, based on said mixed carrier.

There is no any special limitation on the method for producing the aforementioned catalyst according to the present invention. For instance, a method that can be mentioned is one comprising impregnating respectively or simultaneously the carrier with a molybdenum compound solution, a nickel compound solution and a tungsten compound solution, so as to introduce these metal components into the carrier. When a metal component is introduced for the preparation of the catalyst, it is preferably to select the amounts of various components to be used, so that a catalyst is obtained with the calcined (at 550° C. under the atmosphere for 4 hrs) composition of nickel oxide of 1~10 wt %, the sum of molybdenum oxide and tungsten oxide of from more than 10 to 50 wt % and the molar ratio of tungsten oxide to molybdenum oxide of from more than 2.6 to 30; further preferably, nickel oxide of 1~7 wt %, the sum of molybdenum oxide and tungsten oxide contents of from more than 15 to 45 wt %, and the molar ratio of tungsten oxide to molybdenum oxide of from more than 3.1 to 24. There is no any special limitation on said impregnating method, and it can be a conventional one. It is obvious for one skilled in this field that a catalyst having a predetermined content of the metal components can be easily prepared by adjusting and controlling the concentration and amount of each of the solutions to be used, or the amount of the carrier to be used, wherein said solutions refer to the molybdenum compound solution, the nickel compound solution and the tungsten compound solution.

According to the present invention, after said impregnating step, steps like drying and calcining can be introduced as needed. Said drying and calcining conditions are all conventional in this field, for example, those can be mentioned are a drying temperature of 100~300° C., preferably 100~280° C., a drying time of 1~12 hrs, preferably 2~8 hrs; a calcining temperature of 350~550° C., preferably 400~500° C., and a calcining time of 2~8 hrs, preferably 3~6 hrs.

As in the first embodiment, the catalyst according to the second embodiment can further contain an organic compound as the additional component. For the details, please refer to the first embodiment, redundant description thereon should be omitted hereinafter.

The catalyst according to the second embodiment is suitable for hydrotreating a hydrocarbon feedstock to produce hydrocarbon fractions having lowered sulfur content, lowered nitrogen content and lowered aromatics content, especially suitable for hydro-upgrading diesel oil (especially poor diesel oil) to increase its cetane number.

In addition, in the preparation of the catalysts according to the first and second embodiments, the solvent used for formulating various solutions is commonly used in this field, without any special limitation. Therefore, redundant description thereon is omitted herein.

Furthermore, as needed, the catalyst according to the present invention can contain other component that is well known in this field, for instance, one or more selected from the group consisting of boron, titanium, magnesium, gallium, zinc, stannum, germanium and the like.

According to this invention, the contents of the metal components and the adjuvant component in the catalyst according to the present invention can be measured by any conventional method in this field, for example, a X-ray fluorescence spectrometry and the like. Other contents, such as those of the carrier and the organic compounds, can be calculated on the basis of the actual feeding composition.

As a rule in this field, the catalyst according to the present invention can be presulfurized by sulfur, hydrogen sulfide or a sulfur-containing feedstock in the presence of hydrogen at a temperature of 140~370° C. before use, either outside the reactor or inside the reactor in situ, so as to convert the catalyst into a sulfide form.

In another embodiment, the present invention further relates to use of said hydrogenation catalyst in the process for hydrogenating hydrocarbon oil. Said hydrogenation process comprises contacting a hydrocarbon oil feedstock with the present hydrogenation catalyst under hydrogenation conditions in the presence of hydrogen. Said process for hydrogenating hydrocarbon oil can be a hydrocarbon oil hydrotreating process, a hydrocarbon oil hydrorefining process or a hydrocarbon oil hydrocracking process, preferably a hydrocarbon oil hydrotreating process.

In the hydrogenation process according to the present invention, there is no any special limitation on said hydrogenation conditions. Normal reaction conditions can be used, for example, a reaction temperature of 200~420° C., more preferably 220~400° C., a hydrogen partial pressure of 2~18 MPa, more preferably 2~15 MPa, a liquid hourly space velocity of 0.3~10 hrs$^{-1}$, more preferably 0.3~5 hrs$^{-1}$ and a H/O volume ratio of 50~5000, more preferably 50~4000.

By the hydrogenation process according to the present invention, one can hydrogenate various hydrocarbon oil feedstocks. Said hydrocarbon oil feedstock can be selected from various heavy mineral oils, synthetic oils or their mixed distillates, such as one or more selected from the group consisting of crude oil, distillate oil, solvent-refined oil, paraffin jelly, sweat oil, Fischer-Tropsch oil, coal liquefaction oil, light deasphalted oil and heavy deasphalted oil.

The following examples further illustrate but do not limit the present invention.

For convenience, the content of each of the metal components and the adjuvant components in the Examples is expressed as a calcined content, and the content of the phosphors adjuvant component is expressed on an oxide basis, wherein said calcined content refers to the content after calcined at 550° C. under the atmosphere for 4 hrs.

Contents of the metal components in the Examples are measured by using a X-ray fluorescence spectrometry.

EXAMPLES

Examples of Hydrogenation Catalysts According to the First Embodiment

Example 1

1000 g aluminum hydroxide powder (a dry gel powder manufactured by Catalyst Plant of Changling Petro-Chemical Corp., 71 wt % on dry basis) and 520 g a silica sol containing 30% of silica (a product from Qingdao Ocean Chemical Plant) were weighed, mixed and extruded into butterfly stripes with a circumcircle diameter of 1.4 mm by using an extruder, then the obtained wet stripes were dried at 120° C. for 4 hrs and calcined at 600° C. for 3 hrs, then a carrier having a silica content of 18.0 wt % was obtained, named as S1.

200 g of the carrier S1 was weighed and impregnated with 176 ml of an aqueous solution containing 13.3 g ammonium paramolybdate, 18.3 g phosphoric acid (chemical pure, 85% concentration, a product from Beijing Chemical Plant), 24.0 g nickel nitrate and 54.3 g ammonium metatungstate for 3 hrs, then dried at 120° C. for 4 hrs and calcined at 480° C. for 4 hrs, a catalyst was obtained, named as C1. The catalyst C1 after calcined has a composition shown in Table 1.

Comparative Example 1

The Reference catalyst D1 was prepared according to the step-wise co-impregnation method disclosed in the Example 8 of the China Patent CN1083476C, the catalyst D1 after calcined has a composition shown in Table 1.

Example 2

200 g of the carrier S1 was weighed and impregnated with 176 ml of an aqueous solution containing 19.9 g ammonium paramolybdate for 3 hrs, dried at 120° C. for 4 hrs, then dried further at 280° C. for 4 hrs, then the resultant carrier was impregnated with 165 ml of an aqueous solution containing 50.4 g nickel nitrate, 82.8 g ammonium metatungstate and 15.5 g phosphoric acid for 3 hrs, dried at 120° C. for 6 hrs, and then impregnated with 120 ml of an aqueous solution containing 51.1 g ethylene glycol for 3 hrs and dried at 120° C. for 4 hrs, a catalyst was obtained, named as C2. The calculated molar ratio of ethylene glycol to the sum (on an oxide basis) of nickel, molybdenum and tungsten is 1.4. The catalyst C2 after calcined has a composition shown in Table 1.

TABLE 1

| Example | Catalyst No. | Organic Compound | Catalyst composition, wt % | | | | $WO_3/MoO_3$ Molar ratio |
|---|---|---|---|---|---|---|---|
| | | | NiO | $WO_3$ | $MoO_3$ | $P_2O_5$ | |
| 1 | C1 | | 2.2 | 17.0 | 3.9 | 4.1 | 2.7 |
| Comparative Example 1 | D1 | | 4.1 | 19.1 | 9.2 | 3.1 | 1.3 |
| 2 | C2 | Ethylene glycol | 4.1 | 23.0 | 5.2 | 3.1 | 2.7 |

Examples 3~4

The Examples illuminate use of the catalyst according to the present invention for hydrorefining diesel-oil and the effects obtained therewith.

The catalysts C1 and C2 were evaluated on a 20 ml diesel-oil hydrogenation apparatus respectively. The feedstock oil to be used was a catalytic diesel oil having a density of 0.9026 g/ml (20° C.), a refraction index of 1.4699 (20° C.), a nitrogen content of 100 ppm and a sulfur content of 1.1 wt %, and the reaction conditions were: a hydrogen partial pressure of 3.2 MPa, a liquid hourly space velocity of 2.0 $h^{-1}$, a $H_2$/Oil volume ratio of 300:1 and a reaction temperature of 350° C.

Comparative Example 2

The Comparative Example illuminates use of the catalyst D1 for hydrorefining diesel-oil and the effects obtained therewith, which was evaluated as in the Example 3.

The method used for determining the sulfur content is SH/T 0253-92 and the method used for determining the nitrogen content is SH/T 0657-1998. The hydrodesulfurization activity of the catalyst is calculated according to a 1.65-order reaction, and the hydrodenitrogenation activity of the catalyst is calculated according to a 1-order reaction, wherein the calculation equations involved are as follows.

Hydrodenitrogenation Activity=Ln [($N$ content of feedstock)/($N$ content of product)]

Hydrodesulfurization Activity=$LHSV$×[(1/($S$ content of product)$^{0.65}$)−(1/($S$ content of feedstock)$^{0.65}$)]

When taking the activity of D1 catalyst as 100, the effects obtained with catalysts C1 and C2 for hydrorefining diesel-oil are shown in Table 2.

TABLE 2

| | | Relative Activity, % | |
|---|---|---|---|
| Example | Catalyst | Desulfurization | Denitrogenation |
| 3 | C1 | 140 | 118 |
| 4 | C2 | 173 | 136 |
| Comparative Example 2 | D1 | 100 | 100 |

The results from Table 2 show that, in comparison with the prior art, the catalyst according to the present invention has a much higher activity for diesel oil hydrodesulfurization and diesel oil hydrodenitrogenation.

Example 5

1000 g aluminum hydroxide powder (a dry gel powder manufactured by Catalyst Plant of Changling Petro-Chemical Corp., 70 wt % on dry basis) and 150 g of silica sol containing 25% of silica (a product from Qingdao Ocean Chemical Plant) were weighed, mixed and extruded into butterfly stripes with a circumcircle diameter of 1.3 mm by using an extruder, then the obtained wet stripes were dried at 120° C. for 4 hrs and calcined at 600° C. for 3 hrs, a carrier having a silica content of 5.0 wt % was obtained, named as S2.

200 g of the S2 carrier was weighed and impregnated with 176 ml of an aqueous solution containing 26.8 g ammonium fluoride (analytic pure, a product from Beijing Chemical Plant) for 2 hrs, dried at 120° C. for 3 hrs and calcined at 400° C. for 5 hrs, a silica-alumina carrier containing fluorine was obtained. Said carrier was impregnated with 172 ml of an aqueous solution containing 17.9 g ammonium paramolybdate for 3 hrs, dried at 250° C. for 5 hrs, then impregnated with 166 ml of an aqueous solution containing 26.2 g nickel nitrate, 86.7 g ammonium metatungstate and 9.2 g phosphoric acid for 3 hrs, dried at 120 for 8 hrs, a catalyst was obtained, named as C3. C3 catalyst after calcined has a composition shown in Table 3.

Example 6

200 g of the S2 carrier was weighed and impregnated with 176 ml of an aqueous solution containing 31.3 g ammonium fluoride for 2 hrs, dried at 120° C. for 3 hrs and calcined at 400° C. for 3 hrs, a silica-alumina carrier containing fluorine was obtained. Said carrier was impregnated with 170 ml of an aqueous solution containing 21.5 g ammonium molybdate for 3 hrs, dried at 120° C. for 4 hrs and dried further at 250° C. for 4 hrs, a carrier containing molybdenum was obtained. Subsequently said carrier was impregnated with 159 ml of an aqueous solution containing 86.3 g nickel nitrate, 197.7 g ammonium metatungstate, 16.9 g phosphoric acid and 19.2 g citric acid for 4 hrs, and dried at 120° C. for 4 hrs and then dried at 230° C. for 4 hrs, a catalyst was obtained, named as C4. The calculated molar ratio of citric acid to the sum (on an oxide basis) of nickel, molybdenum and tungsten is 0.08. The C4 catalyst after calcined has a composition shown in Table 3.

TABLE 3

| Example | Catalyst No. | Organic Compound | Catalyst Composition, wt % | | | | | $WO_3/MoO_3$ Molar Ratio |
|---|---|---|---|---|---|---|---|---|
| | | | NiO | $WO_3$ | $MoO_3$ | F | $P_2O_5$ | |
| 5 | C3 | | 2.1 | 23.7 | 4.6 | 4.2 | 1.8 | 3.2 |
| 6 | C4 | Citric acid | 5.0 | 39.1 | 4.0 | 3.5 | 2.4 | 8.3 |

Examples 7~8

The Examples illuminate use of the catalyst according to the present invention for hydrotreating vacuum wax oil and the effects obtained therewith.

The C3 and C4 catalysts were evaluated respectively in a 250 ml hydrogenation apparatus. Properties of the feedstock oil to be used and the reaction conditions are shown in Table 4.

Comparative Example 3

The Comparative Example illuminate use of a commercial catalyst RN-1 (a commercial catalyst product from Catalyst Plant of Changling Petro-Chemical Corp.) for hydrotreating vacuum wax oil and the effects obtained therewith, which was evaluated as in the Example 7.

Hydrodesulfurization activity of the catalyst is calculated according to a 1.5-order reaction and hydrodenitrogenation activity of the catalyst is calculated according to a 1-order reaction, wherein the calculation equations involved are as follows.

Hydrodenitrogenation Activity=Ln [(N content of feedstock)/(N content of product)]

Hydrodesulfurization activity=$LHSV \times [(1/(S \text{ content of product})^{0.5}) - (1/(S \text{ content of feedstock})^{0.5})]$ When taking the activity of the RN-1 catalyst as 100, the effects obtained with catalysts C3 and C4 are shown in Table 5.

TABLE 4

| Feedstock oil Properties | |
|---|---|
| Density (20° C.), g/ml | 0.9077 |
| S, ppm | 18000 |
| N, ppm | 1200 |
| Solidifying Point, ° C. | 34 |
| Distillation Range (D1160), | ° C. |
| Initial Boiling Point | 242 |
| 50% | 446 |
| 95% | 511 |
| Reaction conditions | |
| Hydrogen Partial Pressure, MPa | 8.0 |
| Catalyst Volume, ml | 100 |
| Temperature, ° C. | 375 |
| Volume Space Velocity, $h^{-1}$ | 1.0 |
| Hydrogen-to-Oil Ratio, v/v | 800 |

TABLE 5

| | | Relative Activity % | |
|---|---|---|---|
| Example | Catalyst | Hydrodesulfurization | Hydrodenitrogenation |
| 7 | C3 | 139 | 127 |
| 8 | C4 | 188 | 151 |
| Comparative Example 3 | RN-1 | 100 | 100 |

The results from Table 5 show that, in comparison with the prior art, the catalyst according to the present invention has a much higher activity for vacuum wax oil hydrodesulfurization and hydrodenitrogenation.

Example I-1

2000 g aluminum hydroxide powder (a dry gel powder manufactured by Catalyst Plant of Changling Petro-Chemical Corp., 70 wt % on dry basis) and 631 g silica sol containing 25% of silica (a product from Qingdao Ocean Chemical Plant) were weighed, mixed, and extruded into butterfly stripes having a circumcircle diameter of 1.3 mm by using an extruder, the obtained wet stripes were dried at 120° C. for 4 hrs and calcined at 600° C. for 3 hrs, I-S1 carrier having a silica content of 10.1 wt % was obtained.

200 g of the I-S1 carrier was weighed and impregnated with 176 ml of an aqueous solution containing 16.9 g ammonium fluoride (analytic pure, a product from Beijing Chemical Plant) for 2 hrs, dried at 120° C. for 3 hrs and calcined at 480° C. for 3 hrs, a silica-alumina carrier containing fluorine was obtained. Said carrier was impregnated with 170 ml of an aqueous solution containing 11.9 g ammonium paramolybdate (a product from Beijing Chemical Plant, chemical pure) for 3 hrs, dried at 120° C. for 8 hrs and calcined at 400° C. for 3 hrs, then impregnated with 162 ml of an aqueous solution containing 27.2 g nickel nitrate (analytic pure, a product from Beijing Chemical Plant), 57.3 g ammonium metatungstate (technical grade, a product from Sichuan Zigong Hard Alloy Factory) for 3 hrs, the obtained wet stripes were dried at 120° C. for 4 hrs and calcined at 450° C. for 4 hrs, a catalyst was obtained, named as I-C1. The I-C1 catalyst after calcined has a composition shown in Table I-1.

Example I-2

200 g of the I-S1 carrier was weighed and impregnated with 176 ml of an aqueous solution containing 19.1 g ammonium fluoride for 2 hrs, dried 120° C. for 3 hrs and calcined at 420° C. for 3 hrs, a silica-alumina carrier containing fluorine was obtained. Said carrier was impregnated with 170 ml of an aqueous solution containing 24.7 g ammonium paramolybdate for 3 hrs, dried at 280° C. for 8 hrs, then impregnated with 160 ml of an aqueous solution containing 24.6 g nickel nitrate and 66.7 g ammonium metatungstate for 3 hrs, the obtained wet stripes were dried at 120° C. for 4 hrs and calcined at 500° C. for 4 hrs, a catalyst was obtained, named as I-C2. The I-C2 catalyst after calcined has a composition shown in Table I-1.

Example I-3

200 g of the I-S1 carrier was weighed and impregnated with 176 ml of an aqueous solution containing 8.9 g ammonium fluoride for 2 hrs, dried 120° C. for 3 hrs and calcined at 420° C. for 3 hrs, a silica-alumina carrier containing fluorine was obtained. Said carrier was impregnated with 170 ml of an aqueous solution containing 17.5 g ammonium paramolybdate for 3 hrs, dried at 280° C. for 8 hrs, then impregnated with 162 ml of an aqueous solution containing 44.3 g nickel nitrate and 74.4 g ammonium metatungstate for 3 hrs, the obtained wet stripes were dried at 120° C. for 4 hrs and calcined at 500° C. for 4 hrs, a catalyst was obtained, named as I-C3. The I-C3 catalyst after calcined has a composition shown in Table I-1.

Example I-4

800 g aluminum hydroxide powder (the same as that in the Example I-1), 779 g silica sol containing 30 wt % of silica (the same as that in the Example I-1) and 130 g ammonium fluoride were mixed, and extruded into cylindrical stripes having a dimension of 1.3 mm by using an extruder, then dried at 120° C. for 4 hrs and calcined at 580° C. for 3 hrs, a silica-alumina carrier containing fluorine was obtained, with a silica content of 27.0 wt %, named as I-S2.

200 g of the carrier I-S2 was weighed and impregnated with 172 ml of an aqueous solution containing 7.5 g ammonium paramolybdate for 3 hrs, dried at 120° C. for 4 hrs, and dried further at 200° C. for 4 hrs, a carrier containing molybdenum was obtained. Subsequently said carrier was impregnated with 166 ml of an aqueous solution containing 40.9 g nickel nitrate and 100.3 g ammonium metatungstate for 3 hrs, dried at 120° C. for 4 hrs, and dried at 250° C. for 4 hrs, a catalyst was obtained, named as I-C4. The I-C4 catalyst after calcined has a composition shown in Table I-1.

Example I-5

200 g of the carrier I-S2 was weighed and impregnated with 172 ml of an aqueous solution containing 7.5 g ammonium paramolybdate for 3 hrs, dried at 120° C. for 4 hrs, and dried further at 200° C. for 4 hrs, a carrier containing molybdenum was obtained. Subsequently said carrier was impregnated with 170 ml of an aqueous solution containing 40.9 g nickel nitrate, 100.3 g ammonium metatungstate and 12.2 g citric acid for 3 hrs, and dried at 230° C. for 4 hrs, a catalyst was obtained, named as I-C5. The calculated molar ratio of citric acid to the sum (on an oxide basis) of nickel, molybdenum and tungsten is 0.1. The I-C5 catalyst after calcined has a composition shown in Table I-1.

Example I-6

200 g of the carrier I-S1 was weighed and impregnated with 176 ml of an aqueous solution containing 49.4 g ammonium fluoride for 2 hrs, dried at 120° C. for 3 hrs and calcined at 400° C. for 3 hrs, a silica-alumina carrier containing fluorine was obtained. Said carrier was impregnated with 165 ml of an aqueous solution containing 6.2 g ammonium paramolybdate, 85.5 g nickel nitrate and 190.2 g ammonium metatungstate for 3 hrs, dried at 120° C. for 4 hrs, then calcined at 450° C. for 4 hrs. Said carrier was impregnated with 122 ml of an aqueous solution containing 95.6 g ethylene glycol, dried at 120° C. for 6 hrs, then a catalyst was obtained, named as I-C4. The calculated molar ratio of ethylene glycol to the sum (on an oxide basis) of nickel, molybdenum and tungsten is 1.5. The I-C4 catalyst after calcined has a composition shown in Table I-1.

TABLE I-1

| Example | Catalyst No. | Organic Compound | Catalyst Composition, wt % | | | | $WO_3/MoO_3$ Molar Ratio |
|---|---|---|---|---|---|---|---|
| | | | NiO | $WO_3$ | $MoO_3$ | F | |
| I-1 | I-C1 | | 2.5 | 18.0 | 3.5 | 3.0 | 3.2 |
| I-2 | I-C2 | | 2.1 | 19.6 | 6.8 | 3.2 | 1.8 |
| I-3 | I-C3 | | 3.8 | 21.8 | 4.8 | 1.5 | 2.8 |
| I-4 | I-C4 | | 3.4 | 28.5 | 2.0 | 4.2 | 8.8 |
| I-5 | I-C5 | Citric Acid | 3.4 | 28.5 | 2.0 | 4.2 | 8.8 |
| I-6 | I-C6 | Ethylene glycol | 5.2 | 39.5 | 1.2 | 5.8 | 20 |

Examples I-7~I-11

The Examples illuminate the performance of the catalyst according to the present invention.

The respective pyridine hydrogenation performance of the catalysts I-C1 to I-C5 was evaluated in a continuous-flow type micro-reactor chromatographic apparatus by using n-hexane containing 10 wt % of pyridine as the feedstock oil, with 150 mg of the catalyst inventory.

Before feeding the feedstock oil, the catalyst was presulfurized with a mixed solution of 5 wt % of carbon disulfide in cyclohexane, as the sulfurization oil, under the conditions of: a pressure of 4.1 MPa, a temperature of 360° C., a reaction time 4 hrs, a feeding rate of the sulfurization oil of 0.4 ml/minute, a $H_2$ flow rate of 400 ml/minute: then the feedstock oil was fed to carry out the reaction under the reaction conditions of: a pressure of 4.1 MPa, a feedstock oil feeding rate of 0.2 ml/minutes, a volume hydrogen-to-oil ratio of 2000, and a temperature of 360° C. After the reaction was carried out for 3 hrs, sampling was conducted for gas chromatographic analysis on-line. Pyridine hydrogenation activity was calculated according to the equation as follow:

$$A = \ln\frac{100}{100-x}$$

wherein x is the denitrogenation rate of pyridine. When taking the pyridine hydrodenitrogenation activity of the catalyst I-C2 as 100, the relative pyridine hydrodenitrogenation activity of other catalysts can be expressed as, Relative activity=$A_{Cn}/A_{C2} \times 100\%$, wherein $A_{Cn}$ is the activity of the I-C1 catalyst, the I-C3 catalyst, the I-C4 catalyst or the I-C5 catalyst according to the present invention, while $A_{C2}$ is the activity of the I-C2 catalyst. The results obtained are shown in Table I-2.

TABLE I-2

| Example | Catalyst | Relative Hydrodenitrogenation Activity, % |
|---|---|---|
| I-7 | I-C1 | 116 |
| I-8 | I-C2 | 100 |
| I-9 | I-C3 | 111 |
| I-10 | I-C4 | 140 |
| I-11 | I-C5 | 182 |
| I-12 | I-C6 | 189 |

It can be seen from the results shown in Table I-2 that the pyridine hydrodenitrogenation activity of the catalyst according to the present invention increases as the molar ratio of tungsten oxide to molybdenum oxide increases. Furthermore, introducing organic compounds into the catalyst can lead to further improvement of the pyridine hydrodenitrogenation activity of the catalyst.

Examples I-13~I-14

The Examples illustrate use of the catalyst according to the present invention for pre-treating a hydrocracking feedstock oil.

The I-C5 catalyst and a catalyst RN-2 (a commercially available catalyst, a product from the Catalyst Plant of Changling Petro-Chemical Corp.) were evaluated in a 250 ml hydrogenation apparatus respectively, by using a feedstock oil having properties shown in Table I-3 under the reaction conditions of: a hydrogen partial pressure of 15.0 MPa, a space velocity of $1.0\,h^{-1}$, a hydrogen-to-oil ratio of 800:1 and a reaction temperature of 380° C. After the reaction was carried out for 48 hrs, sampling was conducted. The results obtained are shown in Table I-4. The method used for determining the nitrogen content is SH/T 0657-1998; the method used for determining the sulfur content is SH/T 0253-92.

TABLE I-3

| Density (20° C.), g/ml | 0.9171 |
|---|---|
| S, ppm | 7200 |
| N, ppm | 1800 |
| Solidifying Point, ° C. | 40 |
| Distillation Range, D1160 | ° C. |
| Initial Boiling Point | 265 |
| 50% | 460 |
| 95% | 526 |

TABLE I-4

| Example | Catalyst | Nitrogen Content of the Hydrotreated Oil, ppm |
|---|---|---|
| I-13 | RN-2 | 55 |
| I-14 | I-C5 | 24 |

The results in Table I-4 show that the catalyst according to the present invention has a much higher hydrodenitrogenation activity, relative to the commercially available catalyst.

Example II-1

4000 g of aluminum hydroxide dry gel powder (a product from Catalyst Plant of Changling Petro-Chemical Corp.) was weighed and extruded into stripes having a circumcircle diameter of 1.3 mm, the obtained wet stripes were dried at 120° C. for 4 hrs, then calcined at 600° C. for 4 hrs, a carrier was obtained, named as II-S1.

200 g of the II-S1 carrier was weighed and impregnated with 167 ml of an aqueous solution containing 41.6 g ammonium fluoride (analytic pure, a product from Beijing Chemical Plant) for 2 hrs, dried at 120° C. for 3 hrs and calcined at 420° C. for 3 hrs, an alumina carrier containing fluorine was obtained. Said carrier was impregnated with 160 ml of an aqueous solution containing 41.7 g ammonium paramolybdate (chemical pure, a product from Beijing Chemical Plant) for 3 hrs, dried at 120° C. for 4 hrs and calcined at 400° C. for 4 hrs, then cooled to the room temperature. The resultant carrier was impregnated with 152 ml of an aqueous solution containing 48.4 g nickel nitrate (analytic pure, a product from Beijing Chemical Plant), 94.5 ammonium metatungstate (technical grade, a product from Sichuan Zigong Hard Alloy Factory) for 3 hrs, dried at 120° C. for 4 hrs, then calcined at 450° C. for 4 hrs, a catalyst was obtained, named as II-C1. The II-C1 catalyst after calcined has a composition shown in Table II-1.

Example II-2

200 g of the II-S2 carrier was weighed and impregnated with 167 ml of an aqueous solution containing 35.7 g ammonium fluoride for 2 hrs, dried at 120° C. for 3 hrs and calcined at 400° C. for 3 hrs, an alumina carrier containing fluorine was obtained. Said carrier was impregnated with 160 ml of an aqueous solution containing 26.7 g ammonium paramolybdate for 3 hrs, dried at 120° C. for 4 hrs, dried further at 300° C. for 4 hrs, then cooled to the room temperature, the resultant carrier was impregnated with 152 ml of an aqueous solution containing 57.5 g nickel nitrate and 108.7 g ammonium metatungstate for 3 hrs, dried at 120° C. for 4 hrs, then calcined at 450° C. for 4 hrs, a catalyst was obtained, named as II-C2. The II-C2 catalyst after calcined has a composition shown in Table II-1.

Example II-3

200 g of the II-S1 carrier was weighed and impregnated with 167 ml of an aqueous solution containing 28.4 g ammonium fluoride for 2 hrs, dried at 120° C. for 3 hrs and calcined at 420° C. for 3 hrs, an alumina carrier containing fluorine was obtained. Said carrier was impregnated with 160 ml of an aqueous solution containing 22.6 g ammonium paramolybdate for 3 hrs, dried at 120° C. for 4 hrs, and dried further at 280° C. for 4 hrs, then cooled to the room temperature, the resultant carrier was impregnated with 153 ml of an aqueous solution containing 69.8 g nickel nitrate and 110.7 g ammonium metatungstate for 3 hrs, dried at 120° C. for 4 hrs, then calcined at 450° C. for 4 hrs, a catalyst was obtained, named as II-C3. The II-C3 catalyst after calcined has a composition shown in Table II-1.

Example II-4

600 g of aluminum hydroxide dry gel powder, 22.2 g ammonium fluoride, 13 g sesbania powder and 20 ml nitric acid were weighed and mixed together homogeneously, then extruded into butterfly stripes having a dimension of 1.3 mm by using an extruder, then dried at 120° C. for 4 hrs and treated at 580° C. for 3 hrs, an alumina carrier containing fluorine was obtained, named as II-S2.

200 g of the II-S2 carrier was weighed and impregnated with 164 ml of an aqueous solution containing 4.2 g ammonium paramolybdate, 80.5 g nickel nitrate and 132.8 g ammonium metatungstate for 3 hrs, dried at 280° C. for 4 hrs, a catalyst was obtained, named as II-C4. The II-C4 catalyst after calcined has a composition shown in Table II-1.

Comparative Example 1

200 g of II-S1 carrier was weighed and impregnated with 167 ml of an aqueous solution containing 31.2 g ammonium fluoride for 2 hrs, dried at 120° C. for 3 hrs and calcined at 420° C. for 3 hrs, an alumina carrier containing fluorine was obtained. The carrier was impregnated with 162 ml of an aqueous solution containing 74.2 g nickel nitrate and 138.2 g ammonium metatungstate for 3 hrs, dried at 120° C. for 4 hrs, then calcined at 450° C. for 4 hrs, a catalyst was obtained, named as II-D1. The II-D1 catalyst has a composition shown in Table II-1.

Example II-5

200 g of the II-S1 carrier was weighed and impregnated with 167 ml of an aqueous solution containing 15.9 g ammonium fluoride for 2 hrs, dried at 120° C. for 3 hrs and calcined at 420° C. for 3 hrs, an alumina carrier containing fluorine was obtained. Said carrier was impregnated with 162 ml of an aqueous solution containing 6.9 g ammonium paramolybdate, 26.7 g nickel nitrate and 69.3 g ammonium metatungstate for 3 hrs, dried at 120° C. for 4 hrs, dried further at 200° C. for 4 hrs, then cooled to the room temperature, and the cooled carrier was impregnated with 130 ml of an aqueous solution containing 26.3 g EDTA for 3 hrs, dried at 120° C. for 4 hrs, a catalyst was obtained, named as II-C5. The calculated molar ratio of EDTA to the sum (on an oxide basis) of nickel, molybdenum and tungsten is 0.23. The II-C5 catalyst after calcined has a composition shown in Table II-1.

Example II-6

200 g of the II-S1 carrier was weighed and impregnated with 167 ml of an aqueous solution containing 27.8 g ammonium fluoride for 2 hrs, dried at 120° C. for 3 hrs and calcined at 420° C. for 3 hrs, an alumina carrier containing fluorine was obtained. Said carrier was impregnated with 162 ml of an aqueous solution containing 22.5 g ammonium paramolybdate for 3 hrs, dried at 120° C. for 4 hrs, dried further at 300° C. for 4 hrs, then cooled to the room temperature, the resultant carrier was impregnated with 153 ml of an aqueous solution containing 68.0 g nickel nitrate, 108.7 g ammonium metatungstate and 23.9 g citric acid for 3 hrs, dried at 120° C. for 4 hrs, a catalyst was obtained, named as II-C6. The calculated molar ratio of citric acid to the sum (on an oxide basis) of nickel, molybdenum and tungsten is 0.15. The II-C6 catalyst after calcined has a composition shown in Table II-1.

Example II-7

200 g of the II-S1 carrier was weighed and impregnated with 167 ml of an aqueous solution containing 27.4 g ammonium fluoride for 2 hrs, dried at 120° C. for 3 hrs and calcined at 420° C. for 3 hrs, an alumina carrier containing fluorine was obtained. Said carrier was impregnated with 162 ml of an aqueous solution containing 21.6 g ammonium paramolybdate for 3 hrs, dried at 120° C. for 4 hrs, and dried further at 280° C. for 4 hrs, then cooled to the room temperature, the resultant carrier was impregnated with 156 ml of an aqueous solution containing 69.2 g nickel nitrate and 108.9 ammonium metatungstate for 3 hrs, dried at 230° C. for 4 hrs. Said carrier was impregnated with 100 ml of an aqueous solution containing 65.8 g ethylene glycol, dried at 120° C. for 6 hrs, then a catalyst was obtained, named as II-C7. The calculated molar ratio of ethylene glycol to the sum (on an oxide basis) of nickel, molybdenum and tungsten is 1.4. The II-C7 catalyst after calcined has a composition shown in Table II-1.

TABLE II-1

| Example | Catalyst No. | Organic Compound | Catalyst Composition, wt % | | | | $WO_3$/$MoO_3$ Molar Ratio |
|---|---|---|---|---|---|---|---|
| | | | NiO | $WO_3$ | $MoO_3$ | F | |
| II-1 | II-C1 | | 3.5 | 23.4 | 9.7 | 5.9 | 1.5 |
| II-2 | II-C2 | | 4.2 | 26.9 | 6.2 | 5.1 | 2.7 |
| II-3 | II-C3 | | 5.1 | 27.6 | 5.3 | 4.0 | 3.2 |
| II-4 | II-C4 | | 6.0 | 33.8 | 1.0 | 1.5 | 21.0 |
| Comparative Example II-1 | II-D1 | | 5.3 | 33.7 | — | 4.3 | — |
| II-5 | II-C5 | EDTA | 2.4 | 21.3 | 2.0 | 2.8 | 6.6 |
| II-6 | II-C6 | Citric acid | 5.0 | 27.3 | 5.3 | 4.0 | 3.2 |
| II-7 | II-C7 | Ethylene glycol | 5.1 | 27.4 | 5.1 | 3.9 | 3.2 |

Examples II-8~II-13

The Examples illustrate the toluene hydrogenation performance of the catalyst according to the present invention.

In a continuous-flow type micro-reactor chromatographic apparatus, the catalysts II-C1, II-C2, II-C3, II-C4, II-C5 and II-C7 were evaluated respectively by using n-hexane containing 10 wt % of toluene as the feedstock oil, with 150 mg of the catalyst inventory. The catalyst was presulfurized with a mixed solution of 5 wt % of carbon disulfide in cyclohexane, as the sulfurization oil, under the conditions of: a pressure of 4.1 MPa, a temperature of 360° C., a reaction time of 2.5 hrs, a sulfurization oil feeding rate of 0.2 ml/minute and a $H_2$ flow rate of 400 ml/minute: then the feedstock oil was fed to carry out the reaction under the conditions of: a pressure of 4.1 MPa, a feedstock oil feeding rate of 0.1 ml/minute, a volume hydrogen-to-oil ratio of 4000 and a temperature of 360° C. After the reaction was carried out for 3 hrs, sampling was conducted for gas chromatographic analysis on-line.

The toluene conversion is calculated according to the equation as below:

$$x = [(\text{toluene content of feedstock} - \text{toluene content of product})/(\text{toluene content of feedstock})] \times 100\%$$

The results obtained are shown in Table II-2.

Comparative Example II-2

The Comparative Example illustrates toluene hydrogenation performance of the reference catalyst II-D1. The evaluation method is the same as that in the Example II-7. The results obtained are shown in Table II-2.

TABLE II-2

| Example | Catalyst | Toluene Conversion, % |
|---|---|---|
| II-8 | II-C1 | 28.5 |
| II-9 | II-C2 | 30.7 |
| II-10 | II-C3 | 31.9 |
| II-11 | II-C4 | 33.5 |
| Comparative Example II-2 | II-D1 | 24.8 |
| II-12 | II-C5 | 29.2 |
| II-13 | II-C7 | 40.4 |

It can be seen from Table II-2 that the catalyst according to the present invention has a much higher toluene hydro-saturation activity than the NiW/Al$_2$O$_3$ catalyst containing F.

Examples II-14~II-15

The Examples illustrate diesel-oil hydrorefining performance of the catalyst according to the present invention.

The evaluation was carried out in a 20 ml fixed-bed reactor and properties of the feedstock oil to be used are shown in Table II-3. The catalysts II-C3 and II-C6 were ground respectively into particles having a diameter of 20-30 mesh. Before feeding feedstock oil, each of the catalysts was presulfurized with a kerosene containing 2.5 wt % of DMDS under the conditions of: a pressure of 3.2 MPa, a temperature of 290° C., a reaction time of 8 hrs, a sulfurization oil feeding space velocity of 2.0 hrs$^{-1}$ and a hydrogen-to-oil ratio of 300, then the feedstock was fed to carry out the reaction under the conditions of: a hydrogen partial pressure of 6.0 MPa, a hydrogen-to-oil ratio of 300, a space velocity of 2.0 h$^{-1}$ and a reaction temperature of 340° C. After the reaction was carried out for 48 hrs, sampling and analyzing were carried out. The method used for determining the nitrogen content is SH/T 0657-1998.

Comparative Example II-3

The Comparative Example illustrates performance of the Reference catalyst.

Catalyst II-D1 of the Comparative Example was evaluated by using the same method as that in the Example II-14.

Hydrodenitrogenation activity of the catalyst is calculated according to a 1-order reaction with the equation as below:

Hydrodenitrogenation Activity=Ln [(N content of feedstock)/(N content of product)]

When taking the activity of II-D1 catalyst as 100, the effects obtained are shown in Table II-4.

TABLE II-3

|  | Catalytic diesel oil |
|---|---|
| Density (20° C.), g/ml | 0.8968 |
| Refraction index (20° C.) | 1.5136 |
| N, ppm | 814 |
| S, wt % | 0.54 |

TABLE II-4

| Example | Catalyst | Relative Denitrogenation Activity, % |
|---|---|---|
| II-14 | II-C3 | 120 |
| II-15 | II-C6 | 159 |
| Comparative Example II-3 | II-D1 | 100 |

It can be seen from Table II-4 that, when used for hydrorefining diesel-oil, the catalyst according to the present invention has a much higher hydrodenitrogenation activity than the reference catalyst.

Example III-1

2000 g aluminum hydroxide powder (a dry gel powder manufactured by Catalyst Plant of Changling Petro-Chemical Corp., 71% on dry basis) and 1039 g silica sol containing 30% of silica (a product from Qingdao Ocean Chemical Plant) were weighed and mixed, then extruded into butterfly stripes having a circumcircle diameter of 1.4 mm by using an extruder, the obtained wet stripes were dried at 120° C. for 4 hrs and calcined at 600° C. for 3 hrs, then a carrier having a silica content of 18.0 wt % was obtained, named as III-S1.

200 g of the III-S1 carrier was weighed and impregnated with 176 ml of an aqueous solution containing 13.3 g ammonium paramolybdate (analytic pure, a product from Beijing Chemical Plant), 18.3 g phosphoric acid (analytic pure, 85% concentration, a product from Beijing Chemical Plant), 24.0 g nickel nitrate (analytic pure, a product from Beijing Chemical Plant), 54.3 g ammonium metatungstate (technical grade, a product from Sichuan Zigong Hard Alloy Factory) for 3 hrs, dried at 120° C. for 4 hrs and calcined at 480° C. for 4 hrs, a catalyst was obtained, named as III-C1. The III-C1 catalyst after calcined has a composition shown in Table III-1.

Comparative Example III-1

The Reference catalyst III-D1 was prepared by using a step-wise co-immersing method disclosed in the Example 8 of the China Patent CN1083476C. The catalyst after calcined has a composition shown in Table III-1.

Example III-2

200 g of the III-S1 carrier was weighed and impregnated with 176 ml of an aqueous solution containing 16.7 g ammonium paramolybdate for 3 hrs, dried at 120° C. for 4 hrs, then dried further at 220° C. for 4 hrs, and then the resultant carrier was impregnated with 168 ml of an aqueous solution containing 39.4 g nickel nitrate, 82.1 g ammonium metatungstate and 10.2 g phosphoric acid for 3 hrs, dried at 120° C. for 4 hrs and dried further at 240° C. for 4 hrs, a catalyst was obtained, named as III-C2. The III-C2 catalyst after calcined has a composition shown in Table III-1.

Example III-3

200 g of the III-S1 carrier was weighed and impregnated with 176 ml of an aqueous solution containing 8.0 g ammonium paramolybdate and 12.2 g phosphoric acid for 3 hrs, dried at 120° C. for 4 hrs, and dried further at 220° C. for 4 hrs, then the resultant carrier was impregnated with 170 ml of an aqueous solution containing 114.5 g nickel nitrate, 197.5 g ammonium metatungstate and 28.2 g phosphoric acid for 3 hrs, dried at 120° C. for 4 hrs, and dried at 240° C. for 4 hrs, a catalyst was obtained, named as III-C3. The III-C3 catalyst after calcined has a composition shown in Table III-1.

Example III-4

200 g of the III-S1 carrier was weighed and impregnated with 176 ml of an aqueous solution containing 19.9 g ammonium paramolybdate for 3 hrs, dried at 120° C. for 4 hrs, then dried further at 280° C. for 4 hrs, then the resultant carrier was impregnated with 165 ml of an aqueous solution containing 50.4 g nickel nitrate, 82.8 g ammonium metatungstate and 15.5 g phosphoric acid for 3 hrs, then dried at 120° C. for 6 hrs, and then impregnated with 120 ml of an aqueous solution containing 51.1 g ethylene glycol for 3 hrs, dried at 120° C. for 4 hrs, a catalyst was obtained, named as III-C4. The calculated molar ratio of ethylene glycol to the sum (on an oxide basis) of nickel, molybdenum and tungsten is 1.4. The III-C4 catalyst after calcined has a composition shown in Table III-1.

Example III-5

200 g of the III-S1 carrier was weighed and impregnated with 176 ml of an aqueous solution containing 8.0 g ammonium paramolybdate and 12.2 g phosphoric acid for 3 hrs, dried at 120° C. for 4 hrs, then dried further at 250° C. for 4 hrs, and then the resultant carrier was impregnated with 170 ml of an aqueous solution containing 114.5 g nickel nitrate, 197.5 g ammonium metatungstate, 28.2 g phosphoric acid and 24.4 g citric acid for 3 hrs, dried at 120° C. for 6 hrs, a catalyst was obtained, named as III-C5. The calculated molar ratio of citric acid to the sum (on an oxide basis) of nickel, molybdenum and tungsten is 0.1. The III-C5 catalyst after calcined has a composition shown in Table III-1.

ml/minute, a hydrogen-to-oil volume ratio of 2000 and a temperature of 280° C. After the reaction was carried out for 3 hrs, sampling was conducted for gas chromatographic analysis on-line.

Comparative Example III-2

The Comparative Example illustrates 4,6-DMDBT hydrodesulfurization performance of the catalyst III-D1. The evaluation method is the same as that in the Example III-7.

The hydrodesulfurization activity for 4,6-DMDBT is calculated by using the equation as below:

$$A = \ln\frac{100}{100-x}$$

wherein x is the desulfurization rate of 4,6-DMDBT. When taking the activity of the catalyst III-D1 is 100, the relative activity for 4,6-DMDBT hydrodesulfurization of the catalyst according to the present invention can be expressed as: Relative activity=$A_C/A_{D1}\times 100\%$, wherein $A_C$ is the activity of the catalyst according to the present invention, while $A_{D1}$ is the activity of the catalyst III-D1 in the Comparative Example.

The 4,6-DMDBT hydrodesulfurization activities of the catalysts III-C1, III-C2, III-C3, III-C5 and the comparative catalyst III-D1 are shown in Table III-2.

TABLE III-1

| Example | Catalyst No. | Organic Compound | Catalyst Composition, wt % | | | | WO₃/MoO₃ Molar Ratio |
| | | | NiO | WO₃ | MoO₃ | P₂O₅ | |
| --- | --- | --- | --- | --- | --- | --- | --- |
| III-1 | III-C1 | | 2.2 | 17.0 | 3.9 | 4.1 | 2.7 |
| Comparative Example III-1 | III-D1 | | 4.1 | 19.1 | 9.2 | 3.1 | 1.3 |
| III-2 | III-C2 | | 3.3 | 23.5 | 4.5 | 2.1 | 3.2 |
| III-3 | III-C3 | | 6.7 | 39.5 | 1.5 | 5.8 | 16.3 |
| III-4 | III-C4 | Ethylene glycol | 4.1 | 23.0 | 5.2 | 3.1 | 2.7 |
| III-5 | III-C5 | Citric Acid | 6.7 | 39.5 | 1.5 | 5.8 | 16.3 |

Examples III-6~III-9

The Examples illustrate the hydrodesulfurization performance of the catalysts III-C1 to III-C3 and III-C5 for 4,6-dimethyl dibenzothiophene (4,6-DMDBT).

The reaction was carried out in a continuous-flow microreactor chromatographic apparatus by using n-decane containing 0.45 wt % 4,6-DMDBT as the feedstock oil, with 150 mg of the catalyst inventory.

Before feeding the feedstock oil, the catalyst was presulfurized with a mixed solution of 5 wt % carbon disulfide in cyclohexane as the sulfurization oil under the conditions of: a pressure of 4.1 MPa, a temperature of 360° C., a reaction time of 4 hrs, a sulfurization oil feeding rate of 0.4 ml/minute and a H₂ flow rate of 400 ml/minute: then the feedstock oil was fed to carry out the reaction under the reaction conditions of: a pressure of 4.1 MPa, a feedstock oil feeding rate of 0.2

TABLE III-2

| Example | Catalyst | Relative Hydrodesulfurization Activity, % |
| --- | --- | --- |
| III-6 | III-C1 | 112 |
| Comparative Example III-2 | III-D1 | 100 |
| III-7 | III-C2 | 127 |
| III-8 | III-C3 | 143 |
| III-9 | III-C5 | 181 |

The catalyst III-C1 is the same as the catalyst III-D1 in the carrier content and the total metal content, while the catalyst III-C1 has a WO₃/MoO₃ molar ratio of 2.7 and the catalyst III-D1 has a WO₃/MoO₃ molar ratio of 1.3. Due to this difference, the hydrodesulfurization activity of the catalyst III-C1 is apparently more than that of III-D1.

Examples III-10~III-11

The Examples illustrate the diesel-oil hydrorefining performance of the catalyst according to the present invention.

The catalysts III-C1 and III-C4 were evaluated respectively in a 20 ml diesel-oil hydrogenation apparatus. The feedstock oil to be used was a catalytic diesel oil having a density of 0.9026 g/ml (20° C.), a refraction index of 1.4699 (20° C.), a nitrogen content of 100 ppm, a sulfur content of 1.1 wt % and the reaction conditions were: a hydrogen partial pressure of 3.2 MPa, a space velocity of 2.0 h$^{-1}$, a hydrogen-to-oil ratio of 300:1 and a reaction temperature of 350° C.

Comparative Example III-3

The Comparative Example illustrates the diesel-oil hydrorefining performance of the catalyst III-D1, which was evaluated as in the Example III-10.

The method used for determining the sulfur content is SH/T 0253-92 and the method used for determining the nitrogen content is SH/T 0657-1998. The hydrodesulfurization activity of the catalyst is calculated according to a 1.65-order reaction and the hydrodenitrogenation activity of the catalyst is calculated according to a 1-order reaction, wherein the calculation equations involved are as follows, Hydrodesulfurization Activity=$LHSV \times [(1/(S$ content of Product)$^{0.65})-(1/(S$ Content of Feedstock)$^{0.65})]$ Hydrodenitrogenation Activity=$Ln [(N$ Content of Feedstock)/($N$ Content of Product)]

When taking the activity of the III-D1 catalyst as 100, the relative activities of the catalysts III-C1 and III-C4 are shown in Table III-3.

TABLE III-3

| | | Relative Activity, % | |
|---|---|---|---|
| Example | Catalyst | Desulfurization | Denitrogenation |
| III-10 | III-C1 | 140 | 118 |
| III-11 | III-C4 | 173 | 136 |
| Comparative Example III-3 | III-D1 | 100 | 100 |

The results from Table III-3 show that, in comparison with the catalyst according to the prior art, the catalyst according to the present invention has a much higher hydrodesulfurization activity and hydrodenitrogenation activity.

Example IV-1

2000 g aluminum hydroxide powder (a dry gel powder manufactured by Catalyst Plant of Changling Petro-Chemical Corp., 72 wt % on dry basis) was weighed and extruded into cylindrical stripes having a circumcircle diameter of 1.3 mm by using an extruder, the obtained wet stripes were dried at 120° C. for 4 hrs and calcined at 600° C. for 3 hrs, a carrier was obtained, named as IV-S1.

200 g of the carrier IV-S1 was weighed and impregnated with 178 ml of an aqueous solution containing 19.3 g ammonium paramolybdate (chemical pure, a product from Beijing Chemical Plant) for 3 hrs, dried at 120° C. for 8 hrs, then impregnated with 168 ml of an aqueous solution containing 50.7 g nickel nitrate (analytic pure, a product from Beijing Chemical Plant), 85.5 g ammonium metatungstate (technical grade, a product from Sichuan Zigong Hard Alloy Factory), 15.6 g phosphoric acid (85 wt % concentration, chemical pure, a product from Beijing Chemical Plant) for 3 hrs, the obtained wet stripes were dried at 120° C. for 4 hrs and calcined at 450° C. for 4 hrs, a catalyst was obtained, named as IV-C1. The IV-C1 catalyst after calcined has a composition shown in Table IV-1.

Comparative Example IV-1

200 g of the IV-S1 carrier was weighed to produce a reference catalyst, IV-D1, according to the method disclosed in the Example 5 of the CN1083476C, by introducing nickel, molybdenum, tungsten and phosphor therein. The IV-D1 catalyst has a composition shown in Table IV-1.

Example IV-2

200 g of the IV-S1 carrier was weighed and impregnated with 178 ml of an aqueous solution containing 31.2 g ammonium paramolybdate for 3 hrs, dried at 120° C. for 4 hrs, then the resultant carrier was impregnated with 168 ml of an aqueous solution containing 108.2 g nickel nitrate, 151.3 g ammonium metatungstate and 48.7 g phosphoric acid for 3 hrs, dried at 120° C. for 4 hrs and calcined at 450° C. for 4 hrs, a catalyst was obtained, named as IV-C2. The IV-C2 catalyst after calcined has a composition shown in Table IV-1.

Example IV-3

200 g of the IV-S1 carrier was weighed and impregnated with 178 ml of an aqueous solution containing 7.0 g ammonium paramolybdate, 29.2 g nickel nitrate, 70.6 g ammonium metatungstate and 17.8 phosphoric acid for 3 hrs, dried at 120° C. for 4 hrs, and dried further at 220° C. for 4 hrs, then impregnated with 110 ml of an aqueous solution containing 5.9 g ethylene diamine for 2 hrs, dried at 120° C. at 4 hrs, a catalyst was obtained, named as IV-C3. The calculated molar ratio of ethylene diamine to the sum (on an oxide basis) of nickel, molybdenum and tungsten is 0.25. The IV-C3 catalyst after calcined has a composition shown in Table IV-1.

Example IV-4

200 g of the IV-S1 carrier was weighed and impregnated with 178 ml of an aqueous solution containing 18.7 g ammonium paramolybdate and 5.0 g phosphoric acid for 3 hrs, dried at 120° C. for 4 hrs, then dried further at 220° C. for 4 hrs, subsequently the resultant carrier was impregnated with 168 ml of an aqueous solution containing 47.9 g nickel nitrate, 82.1 g ammonium metatungstate and 3.8 g phosphoric acid for 3 hrs, dried at 120° C. for 4 hrs and dried at 240° C. for 4 hrs, then impregnated with 100 ml of an aqueous solution containing 47.0 g ethylene glycol for 2 hrs, dried at 120° C. for 4 hrs, a catalyst was obtained, named as IV-C4. The calculated molar ratio of ethylene glycol to the sum (on an oxide basis) of nickel, molybdenum and tungsten is 1.3. The IV-C4 catalyst after calcined has a composition shown in Table IV-1.

Example IV-5

200 g of the IV-S1 carrier was weighed and impregnated with 178 ml of an aqueous solution containing 6.3 g ammonium paramolybdate for 3 hrs, dried at 120° C. for 4 hrs, then calcined at 250° C. for 4 hrs, and then the resultant carrier was impregnated with 173 ml of an aqueous solution containing 109.2 g nickel nitrate, 193.2 g ammonium metatungstate, 39.4 g phosphoric acid and 23.5 g citric acid for 3 hrs, dried at 120° C. for 6 hrs, a catalyst was obtained, named as IV-C5. The calculated molar ratio of citric acid to the sum (on an oxide basis) of nickel, molybdenum and tungsten is 0.1. The IV-C5 catalyst after calcined has a composition shown in Table IV-1.

TABLE IV-1

| Example | Catalyst No. | Organic Compound | Catalyst Composition, wt % | | | | $WO_3/MoO_3$ Molar Ratio |
|---|---|---|---|---|---|---|---|
| | | | NiO | $WO_3$ | $MoO_3$ | $P_2O_5$ | |
| IV-1 | IV-C1 | | 4.1 | 23.6 | 5.0 | 3.1 | 2.9 |
| Comparative Example IV-1 | IV-D1 | | 4.2 | 19.5 | 9.1 | 3.1 | 1.3 |
| IV-2 | IV-C2 | | 6.7 | 32.0 | 6.2 | 5.9 | 3.2 |
| IV-3 | IV-C3 | Ethylene Diamine | 2.6 | 21.5 | 2.0 | 3.1 | 6.7 |
| IV-4 | IV-C4 | Ethylene glycol | 4.0 | 23.4 | 5.0 | 1.8 | 2.9 |
| IV-5 | IV-C5 | Citric acid | 6.5 | 39.3 | 1.2 | 5.7 | 20 |

Examples IV-6~IV-9

The Examples illustrate the hydrodesulfurization performance of the catalysts IV-C1, IV-C2, IV-C3 and IV-C5 for dibenzothiophene (DBT).

The reaction was carried out in a continuous-flow micro-reactor chromatographic apparatus by using n-decane solution containing 0.9 wt % dibenzothiophene as the feedstock oil, with 150 mg of the catalyst inventory.

Before feeding the feedstock oil, each of the catalysts IV-C1, IV-C2, IV-C3 and IV-C5 was presulfurized with a mixed solution containing 5 wt % carbon disulfide in cyclohexane as the sulfurization oil under the conditions of: a pressure of 4.1 MPa, a temperature of 360° C., a reaction time of 4 hrs, a sulfurization oil feeding rate of 0.4 ml/minute and a $H_2$ flow rate of 400 ml/minute; then the feedstock oil was fed to carry out the reaction under the conditions of: a pressure of 4.1 MPa, a feedstock oil feeding rate of 0.2 ml/minute, a hydrogen-to-oil volume ratio of 2000 and a temperature of 250° C. After the reaction was carried out for 3 hrs, sampling was conducted for gas chromatographic analysis on-line.

Comparative Example IV-2

The Comparative Example illustrates the DBT hydrodesulfurization performance of the IV-D1 reference catalyst, which was evaluated as in the Example IV-6.

The DBT hydrodesulfurization activity is calculated according to the equation as the following.

$$A = \ln\frac{100}{100-x},$$

wherein x is the DBT desulfurization rate. When taking the activity of the reference catalyst IV-D1 as 100, the relative DBT hydrodesulfurization activity of the catalyst according to the present invention is calculated as: Relative activity=$A_C$/$A_{D1}$×100%, wherein $A_C$ is the activity of the catalyst according to the present invention, while $A_{D1}$ is the activity of the catalyst III-D1 according to the Comparative Example.

The hydrodesulfurization activities of the catalysts IV-C1, IV-C2, IV-C3 and IV-C5 according to the present invention, and that of the reference catalyst IV-D1 are shown in Table IV-2.

TABLE IV-2

| Example | Catalyst | Relative Hydrodesulfurization Activity, % |
|---|---|---|
| IV-6 | IV-C1 | 121 |
| IV-7 | IV-C2 | 149 |
| Comparative Example IV-2 | IV-D1 | 100 |
| IV-8 | IV-C3 | 140 |
| IV-9 | IV-C5 | 187 |

As can be seen from Table IV-2, in comparison with the catalyst according to the prior art, the catalysts according to the present invention have a much higher hydrodesulfurization activity.

Examples IV-10 to IV-11

The Examples illustrate diesel-oil hydrorefining performance of the catalysts according to the present invention.

The activity of each of the catalysts IV-C1 and IV-C4 according to the present invention was evaluated in a small scale diesel-oil hydrogenation apparatus. The catalyst was ground into particles with a diameter of 20-30 mesh, and the catalyst amount to be used was 20 ml. Before feeding the feedstock oil, the catalyst was presulfurized with kerosene containing 2.5 wt % DMDS. Properties of the feedstock oil are shown in Table IV-3 and the reaction conditions are of a hydrogen partial pressure of 3.2 MPa, a space velocity of 2.0 $h^{-1}$, a hydrogen-to-oil ratio of 300:1 and a reaction temperature of 350° C.

The method used for determining the sulfur content is SH/T 0253-92, the hydrodesulfurization activity was calculated according to a 1.65-order reaction from the calculation equation as follows:

Hydrodesulfurization Activity=$LHSV$×[(1/(S content of product)$^{0.65}$)−(1/(S content of feedstock)$^{0.65}$)]

The evaluation results for the catalysts are shown in Table IV-4.

Comparative Example IV-3

The Comparative Example illustrates the diesel-oil hydrorefining performance of the reference catalyst IV-D1. The reaction conditions are the same as those in the Example IV-10, and evaluation results for the catalysts are shown in Table IV-4.

TABLE IV-3

| | |
|---|---|
| Density (20° C.), g/ml | 0.8472 |
| Refraction index (20° C.) | 1.4733 |
| N, ppm | 179 |
| S, m % | 1.1 |

TABLE IV-4

| Example | Catalyst | Relative Hydrodesulfurization Activity, % |
|---|---|---|
| IV-10 | IV-C1 | 124 |
| IV-11 | IV-C4 | 163 |
| Comparative Example IV-3 | IV-D1 | 100 |

The results in Table IV-4 show that the diesel-oil hydrodesulfurization performance of the catalysts according to the present invention is superior to that of the catalyst according to the prior art.

Example V-1

2000 g aluminum hydroxide powder (a dry gel powder manufactured by Catalyst Plant of Changling Petro-Chemical Corp., 70 wt % on dry basis) and 299 g silica sol containing 25% of silica (a product from Qingdao Ocean Chemical Plant) were weighed and extruded into butterfly stripes with a circumcircle diameter of 1.3 mm by using an extruder, then the obtained wet stripes were dried at 120° C. for 4 hrs and calcined at 600° C. for 3 hrs, a carrier having a silica content of 5.0 wt % was obtained, named as V-S1.

200 g of the V-S1 carrier was weighed and impregnated with 176 ml of an aqueous solution containing 9.2 g ammonium fluoride (analytic pure, a product from Beijing Chemical Plant) for 2 hrs, dried at 120° C. for 3 hrs and calcined at 500° C. for 3 hrs, a silica-alumina carrier containing fluorine was obtained. Said carrier was impregnated with 172 ml of an aqueous solution containing 14.2 g ammonium paramolybdate (chemical pure, a product from Beijing Chemical Plant) for 3 hrs, dried at 120° C. for 8 hrs, then impregnated with 162 ml of an aqueous solution containing 31.1 g nickel nitrate (analytic pure, a product from Beijing Chemical Plant), 56.5 g ammonium metatungstate (technical grade, a product from Sichuan Zigong Hard Alloy Factory) and 11.3 g phosphoric acid (analytic pure, 85 wt % concentration, a product from Beijing Chemical Plant) for 3 hrs, the obtained wet stripes were dried at 120° C. for 4 hrs and calcined at 450° C. for 4 hrs, a catalyst was obtained, named as V-C1. The V-C1 catalyst after calcined has a composition shown in Table V-1.

Example V-2

200 g of the V-S1 carrier was weighed and impregnated with 176 ml of an aqueous solution containing 26.8 g ammonium fluoride for 2 hrs, dried 120° C. for 3 hrs and calcined at 400° C. for 5 hrs, a silica-alumina carrier containing fluorine was obtained. Said carrier was impregnated with 172 ml of an aqueous solution containing 17.9 g ammonium paramolybdate for 3 hrs, dried at 250° C. for 5 hrs, then impregnated with 166 ml of an aqueous solution containing 26.2 g nickel nitrate, 86.7 g ammonium metatungstate and 9.2 g phosphoric acid for 3 hrs, dried at 120° C. for 8 hrs, a catalyst was obtained, named as V-C2. The V-C2 catalyst after calcined has a composition shown in Table V-1.

Example V-3

200 g of the V-S1 carrier was weighed and impregnated with 176 ml of an aqueous solution containing 9.8 g ammonium fluoride for 2 hrs, dried 120° C. for 3 hrs and calcined at 400° C. for 3 hrs, a silica-alumina carrier containing fluorine was obtained. Said carrier was impregnated with 172 ml of an aqueous solution containing 25.1 g ammonium paramolybdate, 29.6 g nickel nitrate, 67.9 g ammonium metatungstate and 12.1 phosphoric acid for 3 hrs, dried at 120° C. for 8 hrs and calcined at 450° C. for 4 hrs, a catalyst was obtained, named as V-C3. The V-C3 catalyst after calcined has a composition shown in Table V-1.

Example V-4

200 g of the V-S1 carrier was weighed and impregnated with 176 ml of an aqueous solution containing 16.9 g ammonium fluoride for 2 hrs, dried 120° C. for 3 hrs and calcined at 470° C. for 3 hrs, a silica-alumina carrier containing fluorine was obtained. Said carrier was impregnated with 170 ml of an aqueous solution containing 23.0 g ammonium paramolybdate for 3 hrs, dried at 120° C. for 4 hrs, and dried further at 200° C. for 4 hrs, a carrier containing molybdenum was obtained. Subsequently, the carrier was impregnated with 162 ml of an aqueous solution containing 53.2 g nickel nitrate and 140.7 g ammonium metatungstate and 18.1 g phosphoric acid for 3 hrs, dried at 120° C. for 4 hrs, then calcined at 450° C. for 4 hrs, a catalyst was obtained, named as V-C4. The V-C4 catalyst after calcined has a composition shown in Table V-1.

Example V-5

200 g of the V-S1 carrier was weighed and impregnated with 176 ml of an aqueous solution containing 16.9 g ammonium fluoride for 2 hrs, dried 120° C. for 3 hrs and calcined at 420° C. for 3 hrs, a silica-alumina carrier containing fluorine was obtained. Said carrier was impregnated with 170 ml of an aqueous solution containing 23.0 g ammonium paramolybdate for 3 hrs, dried at 120° C. for 4 hrs and dried further at 170° C. for 4 hrs, a carrier containing molybdenum was obtained. Subsequently said carrier was impregnated with 162 ml of an aqueous solution containing 53.2 g nickel nitrate, 140.7 g ammonium metatungstate and 18.1 g phosphoric acid for 3 hrs, dried at 200° C. for 4 hrs, then impregnated with 121 ml of an aqueous solution containing 77.3 g ethylene glycol, dried at 120° C. for 6 hrs, then a catalyst was obtained, named as V-C5. The calculated molar ratio of ethylene glycol to the sum (on an oxide basis) of nickel, molybdenum and tungsten is 1.5. The V-C5 catalyst after calcined has a composition shown in Table V-1.

Example V-6

200 g of the V-S1 carrier was weighed and impregnated with 176 ml of an aqueous solution containing 31.3 g ammonium fluoride for 2 hrs, dried 120° C. for 3 hrs and calcined at 400° C. for 3 hrs, a silica-alumina carrier containing fluorine was obtained. Said carrier was impregnated with 170 ml of an aqueous solution containing 21.5 g ammonium paramolybdate for 3 hrs, dried at 120° C. for 4 hrs and calcined at 450° C. for 4 hrs, a carrier containing molybdenum was obtained. Subsequently said carrier was impregnated with 159 ml of an aqueous solution containing 86.3 g nickel nitrate, 197.7 g ammonium metatungstate, 16.9 g phosphoric acid and 19.2 g citric acid for 3 hrs, then dried at 120° C. for 4 hrs, and then dried at 230° C. for 4 hrs, a catalyst was obtained, named as V-C6. The calculated molar ratio of citric acid to the sum (on an oxide basis) of nickel, molybdenum and tungsten is 0.08. The V-C6 catalyst after calcined has a composition shown in Table V-1.

Example V-7

200 g of the V-S1 carrier was weighed and impregnated with 176 ml of an aqueous solution containing 9.2 g ammonium fluoride for 2 hrs, dried 120° C. for 3 hrs and calcined at 450° C. for 3 hrs, a silica-alumina carrier containing fluorine was obtained. Said carrier was impregnated with 172 ml of an aqueous solution containing 6.9 g ammonium paramolybdate for 3 hrs, dried at 280° C. for 6 hrs. A carrier containing molybdenum was obtained. Subsequently said carrier was impregnated with 165 ml of an aqueous solution containing 66.8 g nickel nitrate, 150.0 g ammonium metatungstate, 29.2 g phosphoric acid and 47.9 g EDTA for 3 hrs, then dried at 120° C. for 4 hrs, and then dried at 150° C. for 4 hrs, a catalyst was obtained, named as V-C7. The calculated molar ratio of EDTA to the sum (on an oxide basis) of nickel, molybdenum and tungsten is 0.2. The V-C7 catalyst after calcined has a composition shown in Table V-1.

Example V-8

600 g of aluminum hydroxide dry gel powder (the same as that in the Example V-1), 568 g silica sol containing 25 wt % of silica (the same as that in the Example V-1) and 167 g ammonium fluoride were mixed homogeneously, then extruded into butterfly stripes having a circumcircle diameter of 1.3 mm by using an extruder, dried at 120° C. for 4 hrs, treated at 580° C. for 3 hrs, a silica-alumina carrier containing fluorine was obtained, named as V-S2, with a silica content of 21.8 wt % (on dry basis).

200 g of the carrier V-S2 was weighed and impregnated with 170 ml of an aqueous solution containing 6.0 g ammonium molybdate for 3 hrs, dried at 120° C. for 4 hrs, and dried further at 200° C. for 4 hrs, a carrier containing molybdenum was obtained. Subsequently said carrier was impregnated with 164 ml of an aqueous solution containing 102.7 g nickel nitrate, 196.9 g ammonium metatungstate and 6.6 g phosphoric acid for 3 hrs, and dried at 120° C. for 4 hrs, a catalyst was obtained, named as V-C8. The V-C8 catalyst after calcined has a composition shown in Table V-1.

reaction time of 2.5 hrs, a sulfurization oil feeding rate of 0.2 ml/minute and a $H_2$ flow rate of 400 ml/minute, then the feedstock oil was fed to carry out the reaction under the conditions of: a pressure of 4.1 MPa, a feedstock oil feeding rate of 0.1 ml/minute, a hydrogen-to-oil volume ratio of 4000 and a temperature of 360° C. After the reaction was carried out for 3 hrs, sampling was conducted for gas chromatographic analysis on-line. The toluene hydrogenation activity is calculated according to the following equation:

$$A = \ln\frac{100}{100-x},$$

wherein x is the toluene conversion. When taking the relative activity of the catalyst V-C3 for toluene hydrogenation as 100, the relative activity of other catalysts for the toluene hydrogenation can be expressed as: Relative Activity=$A_{Cn}$/$A_{C3}$×100%, wherein $A_{Cn}$ is the activity of the catalysts V-C1 to V-C2 and V-C4 to V-C8, while $A_{C3}$ is the activity of the catalyst V-C3. The results obtained are shown in Table V-2.

TABLE V-2

| Example | Catalyst | Relative Hydrogenation Activity, % |
|---|---|---|
| V-9 | V-C1 | 114 |
| V-10 | V-C2 | 132 |
| V-11 | V-C3 | 100 |
| V-12 | V-C4 | 151 |
| V-13 | V-C5 | 201 |
| V-14 | V-C6 | 247 |
| V-15 | V-C7 | 215 |
| V-16 | V-C8 | 173 |

It can be seen from Table V-2 that the toluene hydrogenation activity of the catalyst according to the present invention increases as the molar ratio of tungsten oxide to molybdenum oxide increases. Furthermore, introduction of organic compounds into the catalyst can lead to further improvement of the toluene hydrogenation activity of the catalyst.

TABLE V-1

| Example | Catalyst No. | Organic Compound | NiO | WO$_3$ | MoO$_3$ | F | P$_2$O$_5$ | WO$_3$/MoO$_3$ Molar Ratio |
|---|---|---|---|---|---|---|---|---|
| V-1 | V-C1 | | 2.8 | 17.4 | 4.1 | 1.6 | 2.5 | 2.6 |
| V-2 | V-C2 | | 2.1 | 23.7 | 4.6 | 4.2 | 1.8 | 3.2 |
| V-3 | V-C3 | | 2.5 | 19.6 | 6.8 | 1.6 | 2.5 | 1.8 |
| V-4 | V-C4 | | 3.6 | 32.5 | 5.0 | 2.2 | 3.0 | 4.1 |
| V-5 | V-C5 | Ethylene glycol | 3.6 | 32.5 | 5.0 | 2.2 | 3.0 | 4.1 |
| V-6 | V-C6 | Citric Acid | 5.0 | 39.1 | 4.0 | 3.5 | 2.4 | 8.3 |
| V-7 | V-C7 | EDTA | 4.5 | 34.5 | 1.5 | 1.2 | 4.8 | 14.3 |
| V-8 | V-C8 | | 6.4 | 41.9 | 1.2 | 5.0 | 1.0 | 21.6 |

Examples V-9~V-16

The Examples illustrate the performance of the catalysts according to the present invention.

The toluene hydrogenation performance of each of the catalysts V-C1 to V-C8 was evaluated in a continuous-flow micro-reactor chromatographic apparatus by using n-hexane containing 10 wt % of toluene as the feedstock oil, with 150 mg of the catalyst inventory.

Before feeding the feedstock oil, the catalyst was presulfurized with a mixed solution containing 3 wt % carbon disulfide in cyclohexane as the sulfurization oil under the conditions of: a pressure of 4.1 MPa, a temperature of 320° C., a

Examples V-17~V-19

The Examples illustrate performance of the catalysts according to the present invention for prehydrotreating vacuum wax oil.

Each of the catalysts V-C2, V-C6 and RN-1 (a commercial catalyst, from Catalyst Plant of Changling Petro-Chemical Corp.) was evaluated in a 250 ml hydrogenation apparatus. Properties of the feedstock oil to be used and the reaction conditions are shown in Table V-3.

The method used for determining the sulfur content is SH/T 0253-92 and the method used for determining the nitrogen content is SH/T 0657-1998. The hydrodesulfurization activity of the catalyst is calculated according to a 1.5-order reaction, and the hydrodenitrogenation activity of the catalyst is calculated according to a 1-order reaction, wherein the calculation equations involved are as follows.

Hydrodesulfurization Activity=$LHSV \times [(1/(S$ content of product$)^{0.5})-(1/(S$ content of feedstock$)^{0.5})]$ Hydrodenitrogenation activity=$Ln [(N$ content of feedstock$)/(N$ content of products$)]$ When taking the activity of RN-1 catalyst as 100, the relative activities of other catalysts are shown in Table V-4.

TABLE V-3

| Feedstock Oil Properties | |
| --- | --- |
| Density (20° C.), g/ml | 0.9077 |
| S, ppm | 18000 |
| N, ppm | 1200 |
| Solidifying Point, ° C. | 34 |
| Distillation Range (D1160), ° C. | |
| Initial Boiling Point | 242 |
| 50% | 446 |
| 95% | 511 |
| Reaction Conditions | |
| Hydrogen Partial Pressure, MPa | 8.0 |
| Catalyst Volume, ml | 100 |
| Temperature, ° C. | 375 |
| Volumetric Space Velocity, h$^{-1}$ | 1.0 |
| Hydrogen-to-oil Ratio, v/v | 800 |

TABLE V-4

| | | Relative Activity % | |
| --- | --- | --- | --- |
| Example | Catalyst | Hydrodesulfurization | Hydrodenitrogenation |
| V-20 | V-C2 | 139 | 127 |
| V-21 | V-C6 | 188 | 151 |
| V-22 | RN-1 | 100 | 100 |

The results from Table V-4 show that the catalysts according to the present invention have a much higher hydrodesulfurization and hydrodenitrogenation activity, relative to the commercial catalyst.

Example VI-1

2000 g aluminum hydroxide powder (a dry gel powder manufactured by Catalyst Plant of Changling Petro-Chemical Corp., 72 wt % on dry basis) was weighed, and extruded into cylindrical stripes having a circumcircle diameter of 1.3 mm by using an extruder, the obtained wet stripes were dried at 120 for 4 hrs and calcined at 600° C. for 3 hrs, a carrier was obtained, named as VI-S1.

200 g of the VI-S1 carrier was weighed and impregnated with 176 ml of an aqueous solution containing 11.8 g ammonium fluoride (analytic pure, a product from Beijing Chemical Plant) for 2 hrs, dried at 120° C. for 3 hrs and calcined at 420° C. for 3 hrs, an alumina carrier containing fluorine was obtained. Said carrier was impregnated with 170 ml of an aqueous solution containing 26.7 g ammonium paramolybdate (chemical pure, a product from Beijing Chemical Plant) for 3 hrs, dried at 120° C. for 8 hrs, then impregnated with 162 ml of an aqueous solution containing 38.2 g nickel nitrate (analytic pure, a product from Beijing Chemical Plant), 52.8 g ammonium metatungstate (technical grade, a product from Sichuan Zigong Hard Alloy Factory) and 14.2 g phosphoric acid for 3 hrs, the obtained wet stripes were dried at 120° C. for 4 hrs and calcined at 450° C. for 4 hrs, a catalyst was obtained, named as VI-C1. The VI-C1 catalyst after calcined has a composition shown in Table VI-1.

Example VI-2

200 g of the VI-S1 carrier was weighed and impregnated with 176 ml of an aqueous solution containing 19.6 g ammonium fluoride for 2 hrs, dried at 120° C. for 3 hrs and calcined at 420° C. for 3 hrs, an alumina carrier containing fluorine was obtained. Said carrier was impregnated with 170 ml of an aqueous solution containing 21.5 g ammonium paramolybdate for 3 hrs, dried at 250° C. for 5 hrs, then impregnated with 162 ml of an aqueous solution containing 28.1 g nickel nitrate, 87.3 g ammonium metatungstate and 20.9 g phosphoric acid for 3 hrs, dried at 120 for 4 hrs and calcined 450° C. for 4 hrs, a catalyst was obtained, named as VI-C2. The VI-C2 catalyst after calcined has a composition shown in Table VI-1.

Comparative Example VI-1

200 g of the VI-S1 carrier was weighed to produce a catalyst named as VI-D1 according to the catalyst composition and the producing method disclosed in the Example 5 of the patent CN1083476C. The VI-D1 catalyst after calcined has a composition shown in Table VI-1.

Example VI-3

200 g of the VI-S1 carrier was weighed and impregnated with 176 ml of an aqueous solution containing 12.7 g ammonium fluoride for 2 hrs, dried at 120° C. for 3 hrs and calcined at 400° C. for 5 hrs, an alumina carrier containing fluorine was obtained. Said carrier was impregnated with 170 ml of an aqueous solution containing 25.5 g ammonium paramolybdate for 3 hrs, dried at 120° C. for 4 hrs, and dried further at 300° C. for 4 hrs, then the resultant carrier was impregnated with 160 ml of an aqueous solution containing 90.1 g nickel nitrate, 165.4 g ammonium metatungstate and 33.5 g phosphoric acid for 3 hrs, dried at 230° C. for 4 hrs, a catalyst was obtained, named as VI-C3. The VI-C3 catalyst after calcined has a composition shown in Table VI-1.

Example VI-4

600 g of aluminum hydroxide dry gel powder (the same as that in the Example VI-1) and 135 g ammonium fluoride (analytic pure, a product from Beijing Chemical Plant) were mixed homogeneously, and extruded into butterfly stripes having a dimension of 1.3 mm by using an extruder, dried at 120° C. for 4 hrs and treated at 580° C. for 3 hrs, an alumina carrier containing fluorine was obtained, named as VI-S2.

200 g of the VI-S2 carrier was weighed and impregnated with 172 ml of an aqueous solution containing 6.3 g ammonium paramolybdate, 105.3 g nickel nitrate, 179.5 g ammonium metatungstate and 6.3 g phosphoric acid for 3 hrs, dried at 220° C. for 4 hrs, a catalyst was obtained, named as VI-C4. The VI-C4 catalyst after calcined has a composition shown in Table VI-1.

Example VI-5

200 g of the VI-S1 carrier was weighed and impregnated with 176 ml of an aqueous solution containing 12.7 g ammonium fluoride for 2 hrs, dried at 120° C. for 3 hrs and calcined at 400° C. for 5 hrs, an alumina carrier containing fluorine was obtained. Said carrier was impregnated with 170 ml of an aqueous solution containing 25.5 g ammonium paramolybdate for 3 hrs, dried at 120° C. for 4 hrs and calcined at 450° C. for 4 hrs, then the resultant carrier was impregnated with 152 ml of an aqueous solution containing 90.1 g nickel nitrate, 165.4 g ammonium metatungstate, 33.5 g phosphoric acid and 22.3 g citric acid for 3 hrs, dried at 120° C. for 4 hrs, a catalyst was obtained, named as VI-C5. The calculated molar ratio of citric acid to the sum (on an oxide basis) of nickel, molybdenum and tungsten is 0.1. The VI-C5 catalyst after calcined has a composition shown in Table VI-1.

Example VI-6

200 g of the VI-S1 carrier was weighed and impregnated with 176 ml of an aqueous solution containing 12.7 g ammonium fluoride for 2 hrs, dried at 120° C. for 3 hrs and calcined at 420° C. for 3 hrs, an alumina carrier containing fluorine was obtained. Said carrier was impregnated with 170 ml of an aqueous solution containing 25.5 g ammonium paramolybdate for 3 hrs, dried at 120° C. for 4 hrs and dried further at 300° C. for 4 hrs, subsequently the resultant carrier was impregnated with 156 ml of an aqueous solution containing 90.1 g nickel nitrate, 165.4 g ammonium metatungstate and 33.5 g phosphoric acid for 3 hrs, dried at 280° C. for 4 hrs. Said carrier was impregnated with 120 ml of an aqueous solution containing 85.5 g ethylene glycol, after dried at 120° C. for 6 hrs, a catalyst was obtained, named as VI-C6. The calculated molar ratio of ethylene glycol to the sum (on an oxide basis) of nickel, molybdenum and tungsten is 1.3. The VI-C6 catalyst after calcined has a composition shown in Table VI-1.

TABLE VI-1

| Example | Catalyst No. | Organic Compound | Catalyst Composition, wt % | | | | | $WO_3/MoO_3$ Molar Ratio |
| --- | --- | --- | --- | --- | --- | --- | --- | --- |
| | | | NiO | $WO_3$ | $MoO_3$ | F | $P_2O_5$ | |
| VI-1 | VI-C1 | | 3.3 | 15.6 | 7.4 | 2.0 | 3.0 | 1.2 |
| VI-2 | VI-C2 | | 2.2 | 23.3 | 5.4 | 3.0 | 4.0 | 2.7 |
| Comparative Example VI-1 | VI-D1 | | 4.2 | 19.5 | 9.2 | — | 3.0 | 1.2 |
| VI-3 | VI-C3 | | 5.5 | 34.5 | 5.0 | 1.5 | 5.0 | 4.3 |
| VI-4 | VI-C4 | | 6.8 | 39.6 | 1.3 | 5.8 | 1.0 | 19 |
| VI-5 | VI-C5 | Citric acid | 5.5 | 34.5 | 5.0 | 1.5 | 5.0 | 4.3 |
| VI-6 | VI-C6 | Ethylene glycol | 5.5 | 34.5 | 5.0 | 1.5 | 5.0 | 4.3 |

Examples VI-7~VI-11

The Examples illustrate the respective pyridine hydrodenitrogenation performance of the catalysts VI-C1 to VI-C4 and VI-C6.

The reaction was carried out in a continuous-flow microreactor chromatographic apparatus by using n-hexane containing 10 wt % pyridine as the feedstock oil, with 150 mg of the catalyst inventory.

Before feeding the feedstock oil, each of the catalysts VI-C1, VI-C2, VI-C3, VI-C4 and VI-C6 was presulfurized with a mixed solution containing 5 wt % carbon disulfide in cyclohexane as the sulfurization oil under the conditions of: a pressure of 4.1 MPa, a temperature of 360° C., a reaction time of 2.5 hrs, a sulfurization oil feeding rate of 0.2 ml/minute and a $H_2$ flow rate of 400 ml/minute: then the feedstock oil was fed to carry out the reaction under the conditions of: a pressure of 4.1 MPa, a feedstock oil feeding rate of 0.1 ml/minute, a hydrogen-to-oil volume ratio of 4000, a temperature of 360° C. After the reaction was carried out for 3 hrs, sampling was conducted for gas chromatographic analysis on-line.

Comparative Example VI-2

The Comparative Example illustrates the pyridine hydrodenitrogenation performance of the reference catalyst VI-D1. The evaluation method is the same as that in the Example VI-7.

The pyridine hydrodenitrogenation activity is calculated according to the equation as below:

$$A = \ln\frac{100}{100-x},$$

where x is the pyridine denitrogenation rate. When taking the pyridine hydrodenitrogenation activity of the reference catalyst VI-D1 as 100, the relative activity of the catalyst according to the present invention for pyridine hydrodenitrogenation can be expressed as: Relative Activity=$A_C/A_D$× 100%, wherein $A_C$ is the activity of the catalyst according to the present invention, while $A_D$ is the activity of the reference catalyst.

The relative activities of the catalysts VI-C1~VI-C4, VI-C6 and the reference catalyst VI-D1 for pyridine hydrodenitrogenation are shown in Table VI-2.

TABLE VI-2

| Example, | Catalyst | Relative Hydrodenitrogenation Activity, % |
| --- | --- | --- |
| VI-7 | VI-C1 | 112 |
| VI-8 | VI-C2 | 138 |
| Comparative Example VI-2 | VI-D1 | 100 |
| VI-9 | VI-C3 | 159 |
| VI-10 | VI-C4 | 167 |
| VI-11 | VI-C6 | 189 |

It can be seen from Table VI-2 that the catalysts according to the present invention have a much higher hydrodenitrogenation activities.

Examples VI-12~VI-13

The Examples illustrate the diesel-oil hydrorefining performance of the catalyst according to the present invention.

Each of the catalysts VI-C3 and VI-C5 was evaluated in a 20 ml diesel-oil hydrogenation apparatus. Properties of the feedstock oil to be used and the reaction conditions are shown in Table VI-3.

Comparative Example VI-3

The Comparative Example illustrates the diesel-oil hydrorefining performance of the reference catalyst VI-D1, which was evaluated as in the Example VI-12.

The method used for determining the sulfur content is SH/T 0253-92, the aromatic is measured by a mass spectroscopy, and the method used for determining the nitrogen content is SH/T 0657-1998 hereinafter. The hydrodesulfurization activity of the catalyst is calculated according to a 1.65-order reaction; the hydrodenitrogenation and hydrodearomatization activity of the catalyst is calculated according to a 1-order reaction, wherein the calculation equations involved are as follows.

Hydrodesulfurization Activity=$LHSV \times [(1/(S$ content of product$)^{0.65})-(1/(S$ content of feedstock$)^{0.65})]$ Hydrodenitrogenation activity=$Ln [(N$ content of feedstock$)/(N$ content of product$)]$ When taking the activity of the VI-D1 catalyst as 100, the effects obtained are shown in Table VI-4.

TABLE VI-3

| Feedstock Oil Properties: | |
| --- | --- |
| Density (20° C.), g/ml | 0.9026 |
| N, ppm | 833 |
| S, wt % | 0.45 |
| Aromatics, wt % | 64.6 |
| Monocyclic Ring, | 24.8 |
| Bicyclo-Ring, | 33.3 |
| Tricyclo-Ring, | 6.53 |
| Reaction Conditions: | |
| Hydrogen Partial Pressure, MPa | 3.2 |
| Temperature, ° C. | 350 |
| Volumetric Space Velocity, h$^{-1}$ | 1.5 |
| Hydrogen-to-oil Ratio, v/v | 500 |

TABLE VI-4

| | | Relative Activity, % | | |
| --- | --- | --- | --- | --- |
| Example | Catalyst | Hydrodesulfurization | Hydrodenitrogenation | Hydrodearomatization |
| VI-12 | VI-C3 | 143 | 124 | 132 |
| VI-13 | VI-C5 | 175 | 140 | 148 |
| Comp. Example VI-3 | VI-D1 | 100 | 100 | 100 |

The results from Table VI-4 show that the catalysts according to the present invention have much better performance for desulfurization, denitrogenation and aromatic-saturation in the diesel-oil hydrorefining process.

Example VII-1

1500 g dry gel powder of aluminum hydroxide (a product from Catalyst Plant of Changling Petro-Chemical Corp.) was weighed and extruded into cylindrical stripes having a diameter of 1.3 mm, the obtained wet stripes were dried at 120° C. for 4 hrs, then calcined at 600° C. for 4 hrs, a carrier was obtained, named as VII-S1.

150 g of the VII-S1 carrier was weighed and impregnated with 138 ml of an aqueous solution containing 17.6 g ammonium fluoride (analytic pure, a product from Beijing Chemical Plant) for 2 hrs, dried at 120° C. for 3 hrs and calcined at 400° C. for 3 hrs, an alumina carrier containing fluorine was obtained. Said carrier was impregnated with 127 ml of an aqueous solution containing 10.9 g ammonium paramolybdate (chemical pure, a product from Beijing Chemical Plant) for 3 hrs, dried at 120° C. for 4 hrs and calcined at 450° C. for 3 hrs, then cooled to the room temperature, the resultant carrier was impregnated further with 118 ml of an aqueous solution containing 31.3 g nickel nitrate (analytic pure, a product from Beijing Chemical Plant) and 57.8 ammonium metatungstate (technical grade, a product from Sichuan Zigong Hard Alloy Factory) for 3 hrs, dried at 120° C. for 4 hrs, then calcined at 450° C. for 4 hrs, a catalyst was obtained, named as VII-C1. The VII-C1 catalyst after calcined has a composition shown in Table VII-1.

Example VII-2

150 g of the carrier VII-S1 was weighed and impregnated with 138 ml of an aqueous solution containing 10.9 g ammonium paramolybdate (chemical pure, a product from Beijing Chemical Plant) for 3 hrs, dried at 120° C. for 8 hrs and calcined at 430° C. for 3 hrs, then impregnated with 120 ml of an aqueous solution containing 31.3 g nickel nitrate (analytic pure, a product from Beijing Chemical Plant), 57.8 g ammonium metatungstate (technical grade, a product from Sichuan Zigong Hard Alloy Factory) and 13.9 g phosphoric acid (85 wt % concentration, chemical pure, a product from Beijing Chemical Plant) for 3 hrs, the obtained wet stripes were dried at 120° C. for 4 hrs and calcined at 430° C. for 4 hrs, a catalyst was obtained, named as VII-C2. The VII-C2 catalyst after calcined has a composition shown in Table VII-1.

Example VII-3

150 g of the VII-S1 carrier was weighed and impregnated with 138 ml of an aqueous solution containing 9.3 g ammonium fluoride (analytic pure, a product from Beijing Chemical Plant) for 2 hrs, dried at 120° C. for 3 hrs and calcined at 400° C. for 3 hrs, an alumina carrier containing fluorine was obtained. Said carrier was impregnated with 130 ml of an aqueous solution containing 10.9 g ammonium paramolybdate (chemical pure, a product from Beijing Chemical Plant) for 3 hrs, dried at 120° C. for 4 hrs and calcined at 400° C. for 3 hrs, then cooled to the room temperature, the resultant carrier was impregnated with 121 ml of an aqueous solution containing 31.3 g nickel nitrate (analytic pure, a product from Beijing Chemical Plant), 57.8 ammonium metatungstate (technical grade, a product from Sichuan Zigong Hard Alloy Factory) and 6.6 g phosphoric acid (85 wt % concentration, chemical pure, a product from Beijing Chemical Plant) for 3 hrs, dried at 120° C. for 4 hrs, then calcined at 400° C. for 4 hrs, a catalyst was obtained, named as VII-C3. The VII-C3 catalyst after calcined has a composition shown in Table VII-1.

TABLE VII-1

| Example | Catalyst No. | Catalyst Composition, wt % | | | | | WO₃/MoO₃ Molar Ratio |
|---|---|---|---|---|---|---|---|
| | | NiO | WO₃ | MoO₃ | F | P₂O₅ | |
| VII-1 | VII-C1 | 3.5 | 22.1 | 4.0 | 3.5 | — | 3.5 |
| VII-2 | VII-C2 | 3.5 | 22.1 | 4.2 | — | 3.8 | 3.3 |
| VII-3 | VII-C3 | 3.4 | 21.9 | 3.9 | 1.8 | 1.7 | 3.5 |

Examples VII-4~VII-6

The Examples illustrate the performance of the catalysts according to the present invention for hydrorefining a furfural-dewaxed oil from a third sideline fraction of vacuum distillation.

Each of the catalysts VII-C1, VII-C2 and VII-C3 was evaluated in a hydrogenation apparatus. Properties of the feedstock oil to be used and the reaction conditions are shown in Table VI-2.

The method used for determining the sulfur content is SH/T 0253-92, while the method used for determining the nitrogen content is SH/T 0657-1998. The hydrodesulfurization activity of the catalyst is calculated according to a 1.5-order reaction, while the hydrodenitrogenation activity of the catalyst is calculated according to a 1-order reaction, wherein the calculation equations involved are as follows.

Hydrodesulfurization Activity=$LHSV \times [(1/(S$ content of product$)^{0.5})-(1/(S$ content of feedstock$)^{0.5})]$ Hydrodenitrogenation activity=$Ln [(N$ content of feedstock$)/(N$ content of products$)]$ When taking the activity of the VII-C1 catalyst as 100, the relative activities of other catalysts are shown in Table VII-3.

TABLE VII-2

| Feedstock Oil Properties: | |
|---|---|
| Density (20° C.), g/ml | 0.8883 |
| S, ppm | 1300 |
| N, ppm | 387 |
| Pour point, ° C. | −9 |
| Distillation Range (D1160), ° C. | |
| Initial Boiling Point | 295 |
| 50% | 460 |
| 95% | 501 |
| Reaction Conditions: | |
| Hydrogen Partial Pressure, MPa | 3.5 |
| Catalyst volume, ml | 100 |
| Temperature, ° C. | 320 |
| Volumetric Space velocity, h⁻¹ | 1.0 |
| Hydrogen-to-oil Ratio, v/v | 300 |

TABLE VII-3

| | | Relative activity, % | |
|---|---|---|---|
| Example | Catalyst | Hydrodesulfurization | Hydrodenitrogenation |
| VII-4 | VII-C1 | 100 | 100 |
| VII-5 | VII-C2 | 95 | 90 |
| VII-6 | VII-C3 | 125 | 122 |

The results from Table VII-3 show that the catalyst according to the present invention, when contains both of phosphor and fluorine, has a much higher hydrogenation activity than that of the catalyst according to the present invention, which contains only either of them with the same content as the sum of the both.

Examples of the Catalysts According to the Second Embodiment

Example 1

250 g pseudo-boehmite (a product from Catalyst Plant of Changling Refinery, 72% on dry basis) and 27 g USY-type molecular sieve (a product from Catalyst Plant of Changling Refinery, with a lattice constant of 24.55 angstrom, 74 wt % on dry basis) were mixed and extruded into trefoil stripes having a circumcircle diameter of 1.5 mm, the obtained wet stripes were oven-dried at 120° C. for 4 hrs and calcined at 600° C. for 4 hrs, a S1 carrier was obtained with an alumina content of 90 and a USY-type molecular sieve content of 10%.

100 g of the carrier S1 was weighed and impregnated with 83 ml of an aqueous solution containing 11.3 g ammonium paramolybdate for 2 hrs, and calcined at 400° C. for 4 hrs, then cooled to the room temperature, 80 g of the obtained carrier was weighed, and impregnated once again with 68 ml of an aqueous solution containing 22.9 g ammonium metatungstate and 5.9 g nickel nitrate for 2 hrs, then oven-dried at 200° C. for 6 hrs, a catalyst was obtained, named as C1. The C1 catalyst after calcined has a composition shown in Table 1.

Example 2

150 g of the S2 carrier was prepared according to the Example 1.

100 g of the carrier S2 was weighed and impregnated with 83 ml of an aqueous solution containing 8.3 g ammonium paramolybdate for 2 hrs, and calcined at 400° C. for 4 hrs, then cooled to the room temperature, 80 g of the resultant carrier was weighed and impregnated once again with 68 ml of an aqueous solution containing 25.7 g ammonium metatungstate and 6.0 g nickel nitrate for 2 hrs, then oven-dried at 200° C. for 6 hrs, a catalyst was obtained, named as C2. The C2 catalyst after calcined has a composition shown in Table 1.

Example 3

150 g of the S3 carrier was prepared according to the Example 1.

100 g of the S3 carrier was weighed and impregnated with 83 ml of an aqueous solution containing 7.1 g ammonium paramolybdate for 2 hrs, and calcined at 400° C. for 4 hrs, then cooled to the room temperature, 80 g of the resultant catalyst was weighed and impregnated once again with 68 ml of an aqueous solution containing 26.8 g ammonium metatungstate and 6.1 g nickel nitrate for 2 hrs, then oven-dried at 200° C. for 6 hrs, a catalyst was obtained, named as C3. The C3 catalyst after calcined has a composition shown in Table 1.

Example 4

150 g of the S4 carrier was prepared according to the Example 1.

100 g of the S4 carrier was weighed and impregnated with 83 ml of an aqueous solution containing 3.8 g ammonium paramolybdate for 2 hrs, and calcined at 400° C. for 4 hrs and cooled to the room temperature, then 80 g of the resultant carrier was weighed and impregnated once again with 68 ml of an aqueous solution containing 31.9 g ammonium metatungstate, 8.5 g nickel nitrate and 9.7 g citric acid for 2 hrs, then oven-dried at 200° C. for 6 hrs, a catalyst was obtained, named as C4. In the C4 catalyst, the molar ratio of citric acid to the sum (on an oxide basis) of nickel, molybdenum and tungsten is 0.36. The C1 catalyst after calcined has a composition shown in Table 1.

Example 5

100 g basic silica sol (pH=10.5, SiO$_2$ content of 30%), 146.7 g SB powder (manufactured by Condea Corp.) and 82.2 g PY-type molecular sieve (a product from Catalyst Plant of Changling Refinery, with a lattice constant of 24.59 angstrom, 5 wt % P$_2$O$_5$, 73 wt % on dry basis) were mixed and extruded into trefoil stripes having a circumcircle diameter of 1.6 mm, the obtained wet stripes were oven-dried at 120° C. for 4 hrs and calcined at 580° C. for 4 hrs, a S5 carrier was obtained with a silica content of 15% and an alumina content of 55% and a content of PY-type molecular sieve of 30%.

100 g of the carrier S5 was weighed and impregnated with 84 ml of an aqueous solution containing 7.4 g ammonium paramolybdate, then dried at 300° C. for 3 hrs, and then cooled to the room temperature, 80 g of the resultant carrier was weighed and impregnated again with 68 ml of an aqueous solution containing 37.8 g ammonium metatungstate and 9.4 g nickel nitrate and 2.8 g citric acid for 2 hrs, then oven-dried at 170° C. for 4 hrs, a catalyst was obtained, named as C5. In the C5 catalyst the molar ratio of citric acid to the sum (on an oxide basis) of nickel, molybdenum and tungsten is 0.1. The C5 catalyst after calcined has a composition shown in Table 2.

Example 6

200 g basic silica sol (pH=10.5, SiO$_2$ content is 30%), 83 g SB pseudo-boehmite (a product from Catalyst Plant of Changling Refinery) and 108.1 g HY-type molecular sieve (a product from Catalyst Plant of Changling Refinery, with a lattice constant of 24.62 angstrom, 74 wt % on dry basis) were mixed and extruded into trefoil stripes having a circumcircle diameter of 1.8 mm, the obtained wet stripes were oven-dried at 120° C. for 4 hrs and calcined at 450° C. for 4 hrs, a S6 carrier was obtained. In the S6 carrier the silica content is 30% and the alumina content is 30%, the content of HY-type molecular sieve is 40%.

100 g of the S6 carrier was weighed and impregnated with 83 ml of an aqueous solution containing 3.7 g ammonium paramolybdate for 2 hrs, dried at 280° C. for 3 hrs, then cooled to the room temperature, 80 g of the resultant carrier was weighed and impregnated once again with the aqueous solution containing 41.0 g ammonium metatungstate, 11.7 g nickel nitrate and 10.8 ethylene glycol for 2 hrs, then oven-dried at 120° C. for 4 hrs, a catalyst was obtained, named as C6. In the C6 catalyst the molar ratio of ethylene glycol to the sum (on an oxide basis) of nickel, molybdenum and tungsten is 1.0. The C6 catalyst after calcined has a composition shown in Table 1.

Example 7

133 g basic silica sol (pH=10.5, SiO$_2$ content is 30%), 125 g pseudo-boehmite (a product from Catalyst Plant of Changling Refinery), 25.6 g Siral 40 powder (produced by Condea Corp.) and 118 g USY type molecular sieve (a product from Catalyst Plant of Changling Refinery, with a lattice constant of 2.450 nm, 76 wt % on dry basis) and 11.5 g beta-zeolite (a product from Catalyst Plant of Changling Refinery, with a silica-alumina ratio of 120, 87 wt % on dry basis) were mixed and extruded into trefoil stripes having a circumcircle diameter of 1.8 mm, the obtained wet stripes were oven-dried at 120° C. for 4 hrs and calcined at 580° C. for 4 hrs, a S7 carrier was obtained. In the S7 carrier, the silica content is 20% and the alumina content is 45%, the silica-alumina content is 10%, the content of USY-type molecular sieve is 20% and the content of the beta-molecular sieve is 5%.

100 g of the carrier S7 was weighed and impregnated with 85 ml of an aqueous solution containing 2.1 g ammonium paramolybdate for 2 hrs, dried at 240° C. for 3 hrs, then cooled to the room temperature, 80 g of the resultant carrier was weighed and impregnated again with 78 ml of an aqueous solution containing 55.8 g ammonium metatungstate, 31.6 g nickel nitrate and 39.5 glycerol for 2 hrs, then oven-dried at 120° C. for 4 hrs and oven-dried at 140° C. for 4 hrs, a catalyst was obtained, named as C7. In the C7 catalyst, the molar ratio of glycerol to the sum (on an oxide basis) of nickel, molybdenum and tungsten is 1.8. The C7 catalyst after calcined has a composition shown in Table 1.

TABLE 1

| Example | Catalyst No. | Organic Compound | Catalyst Composition, wt % | | | WO$_3$/MoO$_3$ Molar Ratio |
| --- | --- | --- | --- | --- | --- | --- |
| | | | NiO | WO$_3$ | MoO$_3$ | |
| 1 | C1 | / | 1.5 | 19.3 | 6.7 | 1.8 |
| 2 | C2 | / | 1.5 | 21.1 | 4.9 | 2.7 |
| 3 | C3 | / | 1.5 | 21.8 | 4.2 | 3.2 |
| 4 | C4 | Citric acid | 2.0 | 24.8 | 3.8 | 7.0 |
| 5 | C5 | Citric acid | 2.0 | 26.0 | 5.0 | 3.3 |
| 6 | C6 | Ethylene glycol | 2.5 | 29.0 | 2.0 | 8.9 |
| 7 | C7 | Glycerol | 6.0 | 35.0 | 1.0 | 21.6 |

Examples 8~11

The following Examples illustrate the performance of the catalysts according to the present invention.

The performance of each of the C1~C4 catalysts according to the present invention was evaluated in a fixed bed apparatus having a 20 ml catalyst inventory by using a catalytic diesel oil as the feedstock that has a density of 0.9024 g/cm$^3$, a sulfur content of 4300 ppm, a nitrogen content of 650 ppm and a cetane number of 31.5 under the reaction conditions of a temperature of 355° C., a pressure of 6.4 MPa, a liquid hourly space velocity of 1.25 hrs$^{-1}$ and a H$_2$/Oil volume ratio of 500. The results obtained are shown in Table 2.

Comparative Example 1

The catalyst RIC-1 (a product from Changling Catalyst Plant) was evaluated under the same conditions as in the Example 8. The results obtained are shown in Table 2.

TABLE 2

| | Example | | | | Comparative Example 1 |
|---|---|---|---|---|---|
| | 8 | 9 | 10 | 11 | |
| Catalyst | C1 | C2 | C3 | C4 | RIC-1 |
| Product Density, g/cm³ | 0.8649 | 0.8632 | 0.8612 | 0.8601 | 0.8670 |
| Desulfurization Rate, wt % | 97.1 | 97.9 | 98.1 | 98.2 | 96.1 |
| Denitrogenation Rate, wt % | 98.2 | 98.8 | 99.1 | 99.3 | 97.2 |
| Cetane Number of Product | 41.0 | 41.2 | 41.6 | 42.1 | 40.6 |
| Cetane Number Increment | 9.5 | 9.7 | 10.1 | 10.6 | 9.1 |
| Density Decrement, g/cm³ | 0.0375 | 0.0392 | 0.0412 | 0.0423 | 0.0354 |
| Diesel Oil Yield, V % | >95 | >95 | >95 | >95 | >95 |

As can be seen from Table 3 that, in comparison with the reference catalyst, the catalyst according to the present invention has a much higher activity for desulfurization and denitrogenation. Further, according to this invention, the cetane number of the processed diesel-fuel is further raised by 1.5 units at the most when compared with the conventional catalyst.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

The invention claimed is:

1. A hydrogenation catalyst, comprising:
a carrier;
metal components of nickel, molybdenum and tungsten that are supported on the same carrier; and
an adjuvant comprising a fluorine compound, a phosphor compound, or a combination thereof
wherein a weight of nickel, calculated based on nickel oxide, ranges from 1 to 10 wt %, and a sum of a weight of molybdenum and tungsten, calculated based on molybdenum oxide and tungsten oxide, ranges from 10 to 50 wt %, wherein the weight percentages are based on a total weight of catalyst, wherein a molar ratio of the tungsten oxide to the molybdenum oxide ranges from 2.6 to 30; and
wherein, calculated on an element basis, a content of fluorine and phosphor ranges from 0.2 to 14 wt % of the total weight of catalyst.

2. The hydrogenation catalyst according to claim 1, wherein the weight of the nickel oxide ranges from 1 to 7 wt %, and the sum of the weight of the molybdenum oxide and the weight of the tungsten oxide ranges from 15 to 45 wt %, the molar ratio of the tungsten oxide to the molybdenum oxide ranges from 3.1 to 24, and the content of fluorine and phosphor ranges from 0.5 to 9 wt % of the total weight of catalyst.

3. The hydrogenation catalyst according to claim 1, wherein the molar ratio of the tungsten oxide to the molybdenum oxide ranges from 3.1 to 24.

4. The hydrogenation catalyst according to claim 1, wherein said adjuvant comprises a phosphor compound, and the content of phosphor is 0.4-4 wt % of the total weight of catalyst.

5. The hydrogenation catalyst according to claim 1, wherein said adjuvant comprises a fluorine compound, and the content of fluorine is 1 to 10 wt % of the total weight of catalyst.

6. The hydrogenation catalyst according to claim 1, wherein said adjuvant comprises a phosphor compound and a fluorine compound, and the content of phosphor is 0.2 to 3.5 wt % and the content of fluorine is 1 to 10 wt % of the total weight of catalyst.

7. The hydrogenation catalyst according to claim 1, wherein said carrier comprises a heat-resistant inorganic oxide selected from the group consisting of alumina, silica-alumina, and a combination thereof, optionally mixed with a molecular sieve.

8. The hydrogenation catalyst according to claim 7, wherein said alumina is one or more selected from the group consisting of γ-alumina, κ-alumina, θ-alumina, δ-alumina, and χ-alumina, optionally containing one or more additional components selected from the group consisting of titanium, magnesium, boron, zirconium, thorium, niobium, and rare earth metals.

9. The hydrogenation catalyst according to claim 8, wherein said alumina is γ-alumina or γ-alumina containing one or more additional components selected from the group consisting of titanium, magnesium, boron, zirconium, thorium, niobium, and rare earth metals.

10. The hydrogenation catalyst according to claim 7, wherein the silica content is 2 to 45 wt % and the alumina content is 55 to 98 wt %, based on the weight of silica-alumina.

11. The hydrogenation catalyst according to claim 10, wherein the silica content is 5 to 40 wt % and the alumina content is 60 to 95 wt %, based on the weight of silica-alumina.

12. The hydrogenation catalyst according to claim 7, wherein said molecular sieve is one or more selected from the group consisting of a zeolite molecular sieve and a non-zeolite type molecular sieve, wherein the content of said molecular sieve in the carrier is 0.5 to 85 wt %, based on the weight of the carrier.

13. The hydrogenation catalyst according to claim 12, wherein said molecular sieve is one or more selected from the group consisting of a Y-zeolite molecular sieve, a beta-zeolite molecular sieve, a mordenite molecular sieve and a ZSM-5 molecular sieve, wherein the content of said molecular sieve in the carrier is 5-50 wt %, based on the weight of the carrier.

14. The hydrogenation catalyst according to claim 13, wherein said molecular sieve is one or more selected from the group consisting of a Y-zeolite molecular sieve, a beta-zeolite molecular sieve, and a ZSM-5 molecular sieve.

15. A hydrogenation catalyst, comprising a carrier; and metal components of nickel, molybdenum and tungsten that are supported on the same carrier,
wherein said carrier comprises a molecular sieve, and said hydrogenation catalyst comprises 1-10 wt % of nickel oxide, 10 to 50 wt % of $WO_3$ and $MoO_3$, wherein a molar ratio of $WO_3$ to $MoO_3$ is from 2.6 to 30.

16. The hydrogenation catalyst according to claim 15, wherein nickel oxide is 1 to 7 wt %, the sum of $WO_3$ and $MoO_3$ is from 15 to 45 wt %, the balance being the carrier, and said molar ratio of $WO_3$ to $MoO_3$ is from 3.1 to 24.

17. The hydrogenation catalyst according to claim 15, wherein said carrier is a mixture of alumina, silica-alumina, and a molecular sieve.

18. The hydrogenation catalyst according to claim 17, wherein the silica alumina comprises 2 to 45 wt % of silica and is 55 to 98 wt % of alumina.

19. The hydrogenation catalyst according to claim 18, wherein the silica alumina comprises 5 to 40 wt % of silica and 60 to 95 wt % of alumina.

20. The hydrogenation catalyst according to claim 17, wherein said alumina is one or more selected from the group consisting of γ-alumina, κ-alumina, θ-alumina, δ-alumina and χ-alumina, optionally containing one or more additional components selected from the group consisting of titanium, magnesium, boron, zirconium, thorium, niobium, and rare earth metals.

21. The hydrogenation catalyst according to claim 20, wherein said alumina is γ-alumina or γ-alumina containing one or more additional components selected from the group consisting of titanium, magnesium, boron, zirconium, thorium, niobium, and rare earth metals.

22. The hydrogenation catalyst according to claim 17, wherein said molecular sieve is one or more selected from a zeolite type molecular sieve and a non-zeolite type molecular sieve.

23. The hydrogenation catalyst according to claim 22, wherein said molecular sieve is one or more selected from the group consisting of a Y-zeolite molecular sieve, a beta zeolite molecular sieve, a mordenite molecular sieve, a ZSM-5 molecular sieve, and a SAPO-11 molecular sieve.

24. The hydrogenation catalyst according to claim 23, wherein said molecular sieve is one or more selected from the group consisting of a Y-zeolite molecular sieve, a beta zeolite molecular sieve, a ZSM-5 molecular sieve, and a SAPO-11 molecular sieve.

25. The hydrogenation catalyst according to claim 17, wherein the content of said molecular sieve is 0.5 to 85 wt %, based on the weight of the carrier.

26. The hydrogenation catalyst according to claim 25, wherein the content of said molecular sieve is 1 to 55 wt %, based on the weight of the carrier.

27. The hydrogenation catalyst according to claim 1 or 15, wherein said catalyst contains further one or more organic compounds selected from the group consisting of oxygen-containing and nitrogen-containing organic compounds, wherein the molar ratio of said organic compound to the sum (on an oxide basis) of nickel, molybdenum and tungsten is from 0.03 to 2.

28. The hydrogenation catalyst according to claim 27, wherein said oxygen-containing organic compound is one or more selected from the group consisting of organic alcohols and organic acids, and said nitrogen-containing organic compound is one or more selected from the group consisting of organic amines, wherein the molar ratio of said organic compound to the sum (on an oxide basis) of nickel, molybdenum and tungsten is from 0.08 to 1.5.

29. The hydrogenation catalyst according to claim 1, wherein said hydrogenation catalyst is a hydrotreating catalyst, a hydrorefining catalyst, or a hydrocracking catalyst.

30. The hydrogenation catalyst according to claim 29, wherein said hydrogenation catalyst is a hydrotreating catalyst.

31. A process for hydrogenating hydrocarbon oil, comprising contacting a hydrocarbon oil feedstock with the hydrogenation catalyst according to claim 1 in the presence of hydrogen under hydrogenation conditions.

32. The process for hydrogenating hydrocarbon oil according to claim 31, characterized in that said hydrogenation conditions comprise: a reaction temperature of 200-420° C., a hydrogen partial pressure of 2~18 MPa, a liquid hourly space velocity of 0.3~10 $hrs^{-1}$ and a H2/Oil volume ratio of 50-5000.

33. The process for hydrogenating hydrocarbon oil according to claim 32, characterized in that said hydrogenation conditions comprise: a reaction temperature of 220~400° C., a hydrogen partial pressure of 2~15 MPa, a liquid hourly space velocity of 0.3~5 $hrs^{-1}$ and a H2/Oil volume ratio of 50~4000.

34. The process for hydrogenating hydrocarbon oil according to claim 31, characterized in that said hydrocarbon oil is one or more selected from the group consisting of crude oil, distillate oil, solvent-refined oil, paraffin jelly, sweat oil, Fischer-Tropsch oil, coal liquefaction oil, light deasphalted oil and heavy deasphalted oil.

35. The process for hydrogenating hydrocarbon oil according to claim 31, characterized in that said process for hydrogenating hydrocarbon oil is a process for hydrotreating hydrocarbon oil.

\* \* \* \* \*